(12) United States Patent
Huang et al.

(10) Patent No.: US 7,657,677 B2
(45) Date of Patent: Feb. 2, 2010

(54) BLADE SERVER SYSTEM WITH A MANAGEMENT BUS AND METHOD FOR MANAGING THE SAME

(75) Inventors: Jen-Hsuen Huang, Pate (TW);
Hsiao-Tsu Ni, Hsinchuang (TW);
Yang-Wen Su, Taipei (TW);
Cheng-Hsiang Wu, Tao Yuan Shien (TW)

(73) Assignee: Quanta Computer Inc., Tao Yuan Shien (TW)

(*) Notice: Subject to any disclaimer, the term of this patent is extended or adjusted under 35 U.S.C. 154(b) by 745 days.

(21) Appl. No.: 11/272,901

(22) Filed: Nov. 15, 2005

(65) Prior Publication Data
US 2006/0140211 A1 Jun. 29, 2006

(30) Foreign Application Priority Data
Dec. 27, 2004 (TW) .............................. 93220979 U

(51) Int. Cl.
*G06F 13/00* (2006.01)
(52) U.S. Cl. .................. 710/100; 709/211; 709/251; 370/466; 370/400
(58) Field of Classification Search ................ 370/466; 710/100
See application file for complete search history.

(56) References Cited

U.S. PATENT DOCUMENTS

| | | | | |
|---|---|---|---|---|
| 6,915,362 B2* | 7/2005 | Ramsey et al. | ................ | 710/62 |
| 6,931,475 B2* | 8/2005 | Huang et al. | ................ | 710/316 |
| 6,950,895 B2* | 9/2005 | Bottom | ...................... | 710/301 |
| 7,085,961 B2* | 8/2006 | Chang et al. | .................. | 714/13 |
| 7,339,786 B2* | 3/2008 | Bottom et al. | ......... | 361/679.41 |
| 2002/0124114 A1* | 9/2002 | Bottom et al. | .............. | 709/251 |
| 2002/0124128 A1* | 9/2002 | Qiu | ............................ | 710/302 |
| 2002/0194412 A1* | 12/2002 | Bottom | ...................... | 710/302 |
| 2003/0031187 A1* | 2/2003 | Heffernan et al. | ........... | 370/400 |
| 2003/0033459 A1* | 2/2003 | Garnett | ....................... | 710/100 |
| 2003/0033463 A1* | 2/2003 | Garnett et al. | .............. | 710/300 |
| 2005/0010709 A1* | 1/2005 | Davies et al. | ............... | 710/305 |
| 2005/0021654 A1* | 1/2005 | Kern et al. | ................... | 709/211 |

(Continued)

OTHER PUBLICATIONS

IBM Systems and Technology Group, IBM System Cluster1350,Mar. 2009.*

(Continued)

*Primary Examiner*—Firmin Backer
*Assistant Examiner*—Michael A Chambers
(74) *Attorney, Agent, or Firm*—Rabin & Berdo, P.C.

(57) ABSTRACT

A blade server system with a management bus and method for managing the same. The blade server system includes a connection board and a management module. The connection board is used for modular interconnection, including communication paths for conducting signals including a management bus signal group and a first bus signal group. The management module is used for management of the blade server system using signals including the management bus signal group and the first bus signal group. If a module is detected, the management module selects the detected module through the management bus and acquires module configuration information of the detected module through the first bus signal group. Distribution of power from a power source to the blade server system is determined according to system configuration information including the module configuration information of the module so that the power source is prevented from being overloaded.

12 Claims, 13 Drawing Sheets

U.S. PATENT DOCUMENTS

2005/0033890 A1* 2/2005 Lee .......................... 710/302
2005/0216627 A1* 9/2005 Goud et al. ................. 710/100

OTHER PUBLICATIONS

Francis Chu, Fujitsu Blade System Offers Dependability; Review: Xeon-powered PRIMERGY BX600 is designed to handle multitier applications, eWeek, Nov. 1, 2004.*

Timothy Prickett Morgan, Fujitsu-Siemens Debuts New Entry, Blade Servers, Sep. 1, 2004, ComputerWire.*

Fujitsu Limited, Fujitsu Introduces Space-saving PRIMERGY Blade Server for Corporate Data Centers and Internet Service Providers, Copyright 2002 JCN Newswire. All Rights Reserved, JCN Newswire, Mar. 14, 2002 Thursday.*

7(2) vol. 8 No. 3 ISSN: 1097-8283 ACC-No. 114975162 Fujitsu Computer Systems Corp, Fujitsu delivers no-compromise PRIMERGY BX600 midrange blade server;new blade server offers better density, management capabilities for enterprise consolidation; Information Gatekeepers, Inc., Asia Pacific Telecom, Mar. 1, 2004.*

TechWeb News, Fujitsu Adds Mid-Range Blade Server to PRIMERGY Line, Copyright 2004 CMP Business CMPnetAsia. com, Feb. 18, 2004.*

* cited by examiner

| | 11 | 10 | 9 | 8 | 7 | 6 | 5 | 4 | 3 | 2 | 1 |
|---|---|---|---|---|---|---|---|---|---|---|---|
| z | | | | | | | | | | | |
| a | 12V | 12V | LVSCDBP10 | LVSCDBM10 | LVSCDBP8 | LVSCDBM8 | LVSCDBP11 | LVSCDBM11 | LVREQBP | LVREQBM | Present |
| b | 12V | 12V | LVSCDBP9 | LVSCDBM9 | LVSELBP | LVSELBM | LVIOBP | LVIOBM | BLD_ID1 | 5VSBY_Pre | 5VSBY |
| c | 12V | 12V | LVCDBM | LVCDBP | LVMSGBP | LVMSGBM | LVRSTBP | LVRSTBM | BLD_ID2 | BLD_ID0 | VCC5 |
| d | 12V | 12V | LVACKBP | LVACKBM | LVBSYBP | LVBSYBM | LVATNBP | LVATNBM | BLD_ID3 | 12V_Pre | VCC5 |
| e | 12V | GND | LVSCDBPHP | LVSCDBPHM | LVSCDBP7 | LVSCDBM7 | LVSCDBP6 | LVSCDBM6 | DIFSENB | LVSCDBP5 | LVSCDBM5 |
| f | LVSCDBM4 | LVSCDBP4 | LVSCDBP3 | LVSCDBM3 | LVSCDBP2 | LVSCDBM2 | LVSCDBP1 | LVSCDBM1 | LVSCDBP0 | LVSCDBM0 | CMM_CTS_M |
| g | LVSCDBPLP | LVSCDBPLM | LVSCDBP15 | LVSCDBM15 | LVSCDBP14 | LVSCDBM14 | LVSCDBP13 | LVSCDBM13 | LVSCDBP12 | LVSCDBM12 | CMM_RTS_M |
| h | I2C_SDA | I2C_SCL | USB+ | USB- | HSYNC | VSYNC | BLD_R | BLD_G | BLD_B | D2CLK | D2DATA |
| y | GND | GND | GND | GND | GND | GND | GND | GND | GND | GND | GND |

FIG. 7A

| Mated | 1 | 2 | 3 | 4 | 5 | 6 | 7 | 8 | 9 | 10 |
|---|---|---|---|---|---|---|---|---|---|---|
| A | FC_GIGA_TD1N | FC_GIGA_RD1N | IB_RDN1_P | IB_RDN2_P | IB_RDN3_P | IB_RDN4_P | IB_RDN1_S | IB_RDN2_S | IB_RDN3_S | IB_RDN4_S |
| B | FC_GIGA_TD1P | FC_GIGA_RD1P | IB_RDP1_P | IB_RDP2_P | IB_RDP3_P | IB_RDP4_P | IB_RDP1_S | IB_RDP2_S | IB_RDP3_S | IB_RDP4_S |
| C | GND | GND | GND | GND | GND | GND | GND | GND | GND | GND |
| D | FC_GIGA_TD2N | FC_GIGA_RD2N | IB_TDN1_P | IB_TDN2_P | IB_TDN3_P | IB_TDN4_P | IB_TDN1_S | IB_TDN2_S | IB_TDN3_S | IB_TDN4_S |
| E | FC_GIGA_TD2P | FC_GIGA_RD2P | IB_TDP1_P | IB_TDP2_P | IB_TDP3_P | IB_TDP4_P | IB_TDP1_S | IB_TDP2_S | IB_TDP3_S | IB_TDP4_S |
| F | GND | GND | GND | GND | GND | GND | GND | GND | GND | GND |
| G | F_EN0 | F_EN2 | S_AD0 | S_AD1 | S_AD2 | S_AD3 | S_AD4 | MSCLK | KBCLK | IB_GPIO_I/O |
| H | F_EN1 | S_D0 | STROBE_B | BLD_RX | BLD_TX | 7474_CLEAR | MSDATA | KBDATA | IB_GPIO_S I/O | |

FIG. 7B

| 01 | FC_GIGA_TDN1 | 02 | FC_GIGA_RDN1 | 29 | IB_TDN3_P | 30 | IB_TDN3_S | 57 | EXPB_RXP2 | 58 | EXPB_TXP2 | G1 | GND |
|----|---|----|---|----|---|----|---|----|---|----|---|----|---|
| 03 | FC_GIGA_TDP1 | 04 | FC_GIGA_RDP1 | 31 | IB_TDP3_P | 32 | IB_TDP3_S | 59 | EXPB_RXN2 | 60 | EXPB_TXN2 | G2 | GND |
| 05 | FC_GIGA_TDN2 | 06 | FC_GIGA_RDN2 | 33 | IB_TDN2_P | 34 | IB_TDN2_S | 61 | EXPB_RXP3 | 62 | EXPB_TXP3 | G3 | GND |
| 07 | FC_GIGA_TDP2 | 08 | FC_GIGA_RDP2 | 35 | IB_TDP2_P | 36 | IB_TDP2_S | 63 | EXPB_RXN3 | 64 | EXPB_TXN3 | G4 | GND |
| 09 | IB_RDN4_P | 10 | IB_RDN4_S | 37 | IB_TDN1_P | 38 | IB_TDN1_S | 65 | EXPB_RXP4 | 66 | EXPB_TXP4 | G5 | GND |
| 11 | IB_RDP4_P | 12 | IB_RDP4_S | 39 | IB_TDP1_P | 40 | IB_TDP1_S | 67 | EXPB_RXN4 | 68 | EXPB_TXN4 | G6 | GND |
| 13 | IB_RDN3_P | 14 | IB_RDN3_S | 41 | GB_LED | 42 | IB_GPIO_P | 69 | EXPB_RXP5 | 70 | EXPB_TXP5 | G7 | GND |
| 15 | IB_RDP3_P | 16 | IB_RDP3_S | 43 | FC_LED | 44 | IB_GPIO_S | 71 | EXPB_RXN5 | 72 | EXPB_TXN5 | G8 | GND |
| 17 | IB_RDN2_P | 18 | IB_RDN2_S | 45 | EXPB_100MHZ_CLK_P | 46 | SMB4_CLK | 73 | EXPB_RXP6 | 74 | EXPB_TXP6 | G9 | GND |
| 19 | IB_RDP2_P | 20 | IB_RDP2_S | 47 | EXPB_100MHZ_CLK_N | 48 | SMB4_DAT | 75 | EXPB_RXN6 | 76 | EXPB_TXN6 | G10 | GND |
| 21 | IB_RDN1_P | 22 | IB_RDN1_S | 49 | EXPB_RXP0 | 50 | EXPB_TXP0 | 77 | EXPB_RXP7 | 78 | EXPB_TXP7 | G11 | GND |
| 23 | IB_RDP1_P | 24 | IB_RDP1_S | 51 | EXPB_RXN0 | 52 | EXPB_TXN0 | 79 | EXPB_RXN7 | 80 | EXPB_TXN7 | G12 | GND |
| 25 | IB_TDN4_P | 26 | IB_TDN4_S | 53 | EXPB_RXP1 | 54 | EXPB_TXP1 | 81 | SYS_PWRGD2 | 82 | WAKE_N | | |
| 27 | IB_TDP4_P | 28 | IB_TDP4_S | 55 | EXPB_RXN1 | 56 | EXPB_TXN1 | 83 | GND | 84 | GND | | |

FIG. 7C

| 01 | P2_AD27 | 02 | P2_AD31 | 41 | P2_AD7 | 42 | P2_CBE-L3 | 81 | P2_AD51 | 82 | RESERVE_PME-L | G1 | GND |
|---|---|---|---|---|---|---|---|---|---|---|---|---|---|
| 03 | P2_AD26 | 04 | P2_AD30 | 43 | P2_AD6 | 44 | P2_CBE-L2 | 83 | P2_AD50 | 84 | PCIIRQ-L10 | G2 | GND |
| 05 | P2_AD25 | 06 | P2_AD29 | 45 | P2_AD5 | 46 | P2_CBE-L1 | 85 | P2_AD49 | 86 | PCIIRQ-L9 | G3 | GND |
| 07 | P2_AD24 | 08 | P2_AD28 | 47 | P2_AD4 | 48 | P2_CBE-L0 | 87 | P2_AD48 | 88 | SCSI_IRQB-L | G4 | GND |
| 09 | P2_AD23 | 10 | FC_PRESENT_N | 49 | P2_AD3 | 50 | P2_M66EN | 89 | P2_AD47 | 90 | SCSI_IRQA-L | G5 | GND |
| 11 | P2_AD22 | 12 | PCIIRQ-L7 | 51 | P2_AD2 | 52 | P2_ACK64-L | 91 | P2_AD46 | 92 | ZCR_PRESENT-L | G6 | GND |
| 13 | P2_AD21 | 14 | PCIIRQ-L6 | 53 | P2_AD1 | 54 | P2_REQ64-L | 93 | P2_AD45 | 94 | ZCR_GNT-L | G7 | GND |
| 15 | P2_AD20 | 16 | PCIX_CLK1 | 55 | P2_AD0 | 56 | P2_PAR64 | 95 | P2_AD44 | 96 | VCC5SBY | G8 | GND |
| 17 | P2_AD19 | 18 | PCIX_RST-L | 57 | P2_AD63 | 58 | SMB0_SDA | 97 | P2_AD43 | 98 | VCC3_3SBY | G9 | GND |
| 19 | P2_AD18 | 20 | P2_PGNT-L0 | 59 | P2_AD62 | 60 | P2_CBE-L7 | 99 | P2_AD42 | 100 | VCC5 | G10 | GND |
| 21 | P2_AD17 | 22 | P_REQ-L0 | 61 | P2_AD61 | 62 | P2_CBE-L6 | 101 | P2_AD41 | 102 | VCC5 | G11 | GND |
| 23 | P2_AD16 | 24 | P2_PAR | 63 | P2_AD60 | 64 | P2_CBE-L5 | 103 | P2_AD40 | 104 | VCC5 | G12 | GND |
| 25 | P2_AD15 | 26 | P2_STOP-L | 65 | P2_AD59 | 66 | P2_CBE-L4 | 105 | P2_AD39 | 106 | VCC5 | | |
| 27 | P2_AD14 | 28 | P2_DEVSEL-L | 67 | P2_AD58 | 68 | PCIXCAP | 107 | P2_AD38 | 108 | VCC3_3 | | |
| 29 | P2_AD13 | 30 | P2_TRDY-L | 69 | P2_AD57 | 70 | P_REQ-L2 | 109 | P2_AD37 | 110 | VCC3_3 | | |
| 31 | P2_AD12 | 32 | P2_IRDY-L | 71 | P2_AD56 | 72 | P2_PGNT-L2 | 111 | P2_AD36 | 112 | VCC3_3 | | |
| 33 | P2_AD11 | 34 | P2_FREAME-L | 73 | P2_AD55 | 74 | PCIX_CLK2 | 113 | P2_AD35 | 114 | VCC3_3 | | |
| 35 | P2_AD10 | 36 | P2_SERR-L | 75 | P2_AD54 | 76 | IDSEL2 | 115 | P2_AD34 | 116 | VCC3_3 | | |
| 37 | P2_AD9 | 38 | P2_PERR-L | 77 | P2_AD53 | 78 | IDSEL1 | 117 | P2_AD33 | 118 | VCC3_3 | | |
| 39 | P2_AD8 | 40 | SMB0_SCL | 79 | P2_AD52 | 80 | P2_LOCK-L | 119 | P2_AD32 | 120 | 12V | | |

FIG. 7D

| 02 | PERR | 01 | SERR |
|---|---|---|---|
| 04 | SMB_CLK2 | 03 | GND |
| 06 | SMB_DATA2 | 05 | GND |
| 08 | GND | 07 | GND |
| 10 | 12V | 09 | 12V |
| 12 | 12V | 11 | 12V |
| 14 | GND | 13 | GND |
| 16 | GND | 15 | GND |
| 18 | 3V3 | 17 | 3V3 |
| 20 | 3V3 | 19 | 3V3 |
| 22 | GND | 21 | 3V3 |
| 24 | 5V | 23 | GND |
| 26 | 5V | 25 | 1.5V |
| 28 | 5V | 27 | 1.5V |
| 30 | 5V | 29 | 1.5V |
| 32 | GND | 31 | GND |
| 34 | GND | 33 | GND |
| 36 | 3V3STB | 35 | GND |
| 38 | 3V3STB | 37 | PRESENT1 |
| 40 | PME | 39 | PRESENT2 |

FIG. 7E

| 02 | | 01 | |
|---|---|---|---|
| 02 | PRESENT | 01 | EXPA_TX_N1 |
| 04 | PCI_RST | 03 | EXPA_TX_P1 |
| 06 | SYSTEM_PWR_OK | 05 | GND |
| 08 | SMB_CLK | 07 | EXPA_RX_P3 |
| 10 | SMB_DATA | 09 | EXPA_RX_N3 |
| 12 | 12V | 11 | GND |
| 14 | 5V | 13 | EXPA_TX_P3 |
| 16 | 3V3 | 15 | EXPA_TX_N3 |
| 18 | 3V3 | 17 | GND |
| 20 | 3V3 | 19 | EXPA_RX_N2 |
| 22 | 3V3 | 21 | EXPA_RX_P2 |
| 24 | 3V3STB | 23 | GND |
| 26 | 1.5V | 25 | EXPA_TX_P0 |
| 28 | 1.5V | 27 | EXPA_TX_N0 |
| 30 | GND | 29 | GND |
| 32 | EXPA_TX_N2 | 31 | EXPA_RX_N0 |
| 34 | EXPA_TX_P2 | 33 | EXPA_RX_P0 |
| 36 | GND | 35 | GND |
| 38 | EXPA_CLOCK_N | 37 | EXPA_RX_N1 |
| 40 | EXPA_CLOCK_P | 39 | EXPA_RX_P1 |

FIG. 7F

BLADE SERVER SYSTEM WITH A MANAGEMENT BUS AND METHOD FOR MANAGING THE SAME

This application claims the benefit of Taiwan application Serial No. 93220979, filed Dec. 27, 2004, the subject matter of which is incorporated herein by reference.

BACKGROUND OF THE INVENTION

1. Field of the Invention

The invention relates in general to a server system and a management method, and more particularly to a blade server system with a management bus and method for management thereof.

2. Description of the Related Art

A blade server system is a high-density system capable of containing a number of server blades each of which is electrically connected to a common middle plane, or midplane, of the blade server system through corresponding connectors of the server blades specifically designed with high-density pin or socket contact assignment. These contacts of the connectors conduct power signals, high-speed data signals, low-speed data signals, and universal serial bus (USB) signals for the support for different features required by the server blade.

The design of a blade server system requires a balance between the improvement on server performance and the saving of space occupation of the server blades on the middle plane, which provides connection between the inserted server blades and shared resources of the blade server system. Thus, a need for optimum arrangements for the contacts of the connectors for specific functions required by the server blade in limited space is more important than that for providing high-speed signal transmission.

In addition, the design of a blade server system is a trade-off between features and power resource. In order to prevent the power resource from being overloaded, the blade server system may need to worsen its performance or, if necessary, turn off some modules of the system. In the worst case, unexpected system shutdown would occur in case of the power resource overloaded with the whole system.

The operation of a number of conventional buses in the blade server system has a significant impact on the power resource for the blade server system. Before the whole system powering on, system configuration information has to be collected and the system configuration checked. The system needs to update that information frequently even after powered on. After system is powered on, most of the conventional buses, for example, video, COM, inter-integrated circuit (I2C), operate to collect system configuration information. Some of the buses are required operating under standby power from the power source, thus having significant impact on the standby power resource.

Accordingly, it is desirable to reduce the risk of unpredictable shutdown of the blade server system due to such power impact.

SUMMARY OF THE INVENTION

It is therefore an object of the invention to provide a blade server system with a management bus for management of the blade server system, wherein the management bus has priority over other buses including I2C, COM buses, in the blade server system. The blade server system is operative to employ the management bus to control the other functional bus, for example I2C bus, to acquire system configuration information of the blade server system including module configuration information with respect to a module associated with the blade server system. In addition, distribution of power from a power source to the blade server system can be determined according to the system configuration information including the module configuration information with respect to the associated module so that the power source is prevented from being overloaded with the blade server system.

In accordance to the object of the invention, a blade server system is provided. The blade server system includes a connection board and a management module. The connection board is used for modular interconnection, including a plurality of communication paths for conducting signals including a management bus signal group and a first bus signal group. The management module, removably connected to the connection board, is used for management of the blade server system using signals including the management bus signal group and the first bus signal group. In response to a signal indicating a module connection to the connection board, the management module determines an address associated with the module connection through the management bus signal group and acquires module configuration information with respect to the address through the first bus signal group. The management module determines distribution of power from a power source to the blade server system according to system configuration information including the module configuration information with respect to the address so that the power source is prevented from being overloaded with the blade server system.

In accordance to the object of the invention, a blade server system is provided. The blade server system includes a connection board, a management module, and a removable module. The connection board is used for modular interconnection and includes a plurality of communication paths for conducting a plurality of signals including a management bus signal group and a first bus signal group. The management module, removably connected to the connection board, is employed for management of the blade server system using signals including the management bus signal group and the first bus signal group. The removable module, removably connected to the connection board, includes a management bus interface circuit. The management bus interface circuit, in response to the management bus signal group, is used for selectively controlling application of power from a power source to the removable module and activation of function of the first bus signal group on the removable module.

In accordance to the object of the invention, a method is provided for managing a system including a connection board for modular communication using a plurality of signal groups including a first signal group and a second signal group. The method includes the following steps. First, a management module is provided associated with the connection board for management of the system using at least the first signal group and the second signal group. A detection is then made as to whether there is any removable module connected to the connection board. If a removable module is detected to be connected to the connection board, an address associated with the removable module is determined through the first signal group. Function of the second signal group with respect to the determined address on the removable module is activated through the first signal group. Module configuration information with respect to the determined address is acquired through the second signal group. Next, the management module determines distribution of power from a power source to the system according to system configuration information including the module configuration information with respect to the determined address.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 7A is a pin assignment of the second connector in FIG. 6 compliant with a first connector specification.

FIG. 7B is a pin assignment of the second connector in FIG. 6 compliant with a second connector specification.

FIG. 7C is a pin assignment of the second connector in FIG. 6 compliant with a third connector specification.

FIG. 7D is a pin assignment of the second connector in FIG. 6 compliant with a fourth connector specification.

FIG. 7E is a pin assignment of the second connector in FIG. 6 compliant with a fifth connector specification.

FIG. 7F is another pin assignment of the second connector in FIG. 6 compliant with the fifth connector specification.

DETAILED DESCRIPTION OF THE INVENTION

Basic System Structure

Figure 1:
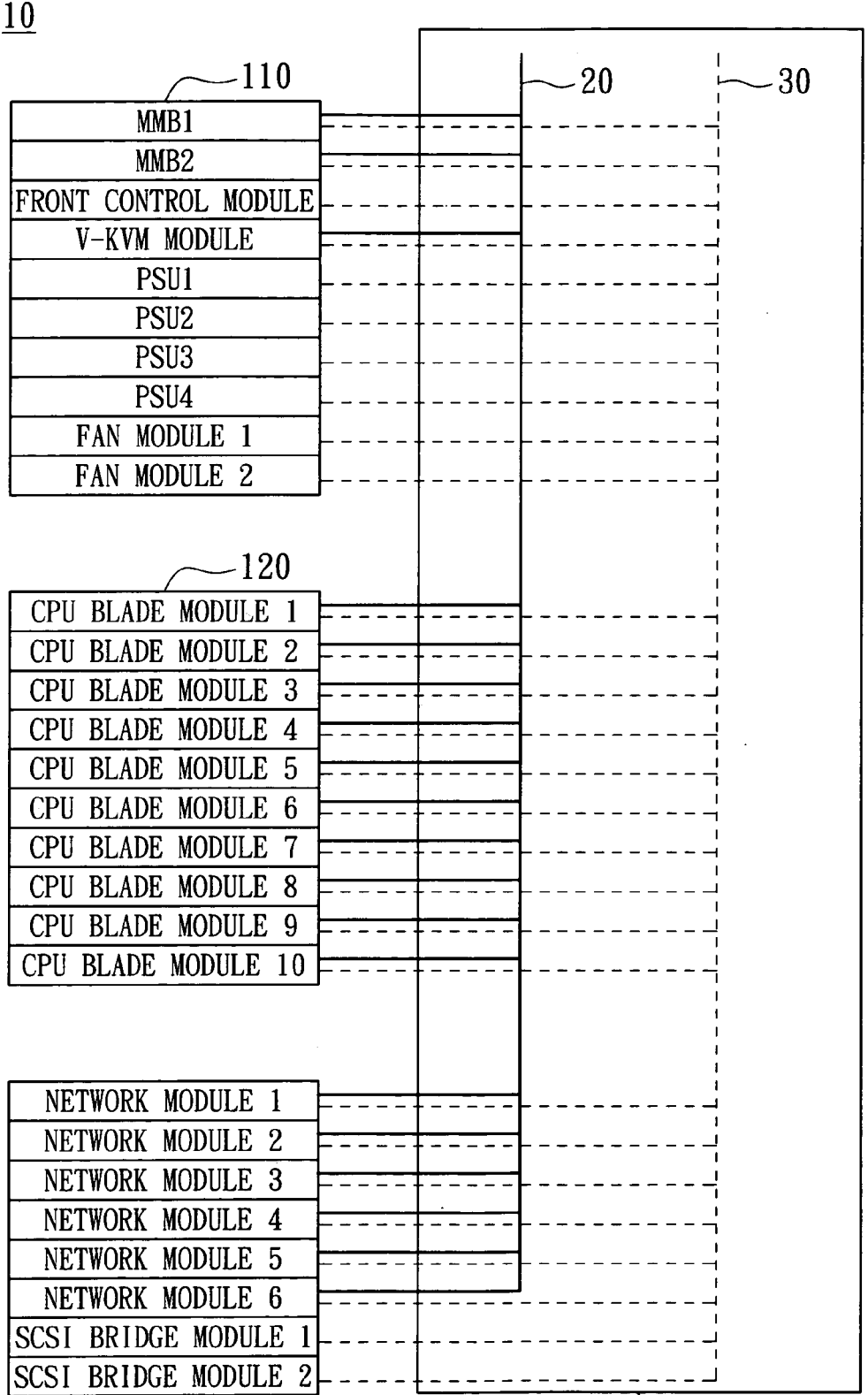
FIG. 1 illustrates the basic structure of a blade server system with a management bus according to an embodiment of the invention.

Referring to FIG. 1, the basic structure of a blade server system with a management bus is shown according to an embodiment of the invention. According to the invention, the blade server system 10 provides a management bus 20 for management of the blade server system 10, which has priority over other functional buses 30 such as inter-integrated circuit (I2C) bus in the blade server system 10. The blade server system 10 is enabled to control a number of removable modules, such as processing blade modules, network modules, and KVM module, that connect to the management bus 20. In one embodiment, a management module of the blade server system 10 serves as a management unit for collecting information of the configuration of the system through the management bus 20 and at least a functional bus. The system configuration information that the management module acquires includes configuration information of, for example, a number of linked modules or a removable module that has just plugged into the system. The management module can determine distribution, according to the collected configuration information of the system, of power from a power resource to the blade server system, including the modules linked to the system.

The power source is prevented from being overloaded with the blade server system under the power distribution determined by the management module according to the collected system configuration information. For example, when it is determined that the power source would not be overloaded under the status of the current system configuration, the management module enables functional buses and provides main power for a removable module which has plugged into the system by the power source and turn on the removable module. Conversely, when the power source would be overloaded or unstable under the status of the current system configuration, the management module can decide not to enable main power for that removable module and not to turn on this module immediately.

In this way, a significant impact on the power resource, such as impact standby power resource due to module addition, can be detected and the risk of unpredictable shutdown of the system due to such impact can be avoided by the distribution of power determined by the management module according to the system configuration information collected.

In one embodiment, the blade server system 10 has a chassis (not shown) housing all the components of the blade server system 10 and having a capacity for a number of removable modules to connect to the system to share common infrastructure resource, for example power resource, cooling devices, KVM (short for keyboard, video, and mouse), optical disk access, and network connection. The blade server system 10, as shown in FIG. 1, provides in the chassis different numbers or types of slots or bays for module insertion and removal, for example, 10 blade bays for up to ten processing blade modules (CPU blade modules 1 to 10), six network module bays for up to six switch modules (network modules 1 to 6), two Small Computer System Interface (SCSI) bridge module bays for up to two bridge modules (SCSI bridge modules 1 and 2), two management module bays for up to two management modules (MMB1 and MMB2), four power supply module bays for up to four power supply modules (PSU1 to PSU4), two cooling module bays for up to two cooling modules (fan modules 1 and 2), a virtual-keyboard-video-mouse (KVM) module bay for a KVM module, and a front control module.

A removable module can be inserted into one of the bays or slots of the chassis and linked to other modules through a connection board 10 for modular interconnection. A processing blade module having one or more microprocessors, main memory, cooperating chipsets, hard drives, and network interfaces for information processing, configured in a hot-pluggable manner, and serving as an independent web server, database server, email or communication server, is an example of a removable module. Another example of a removable module is a network module, such as a network switch for gigabit Ethernet or 10 gigabit Infiniband bus. The connection board 100 can be a midplane or backplane, and can be implemented with a printed circuit board having a plurality of connectors for a plurality of various removable modules to plug into for modular interconnection. In addition to electrical connection, the connection board 100 can be implemented with a board providing optical connection, channels, and/or media, in part or fully, for modular interconnection and thus a removable module may link to the connection board 100 in an optical connection manner without using connectors having contacts or pins.

Module Interconnection Structure

Figure 2:
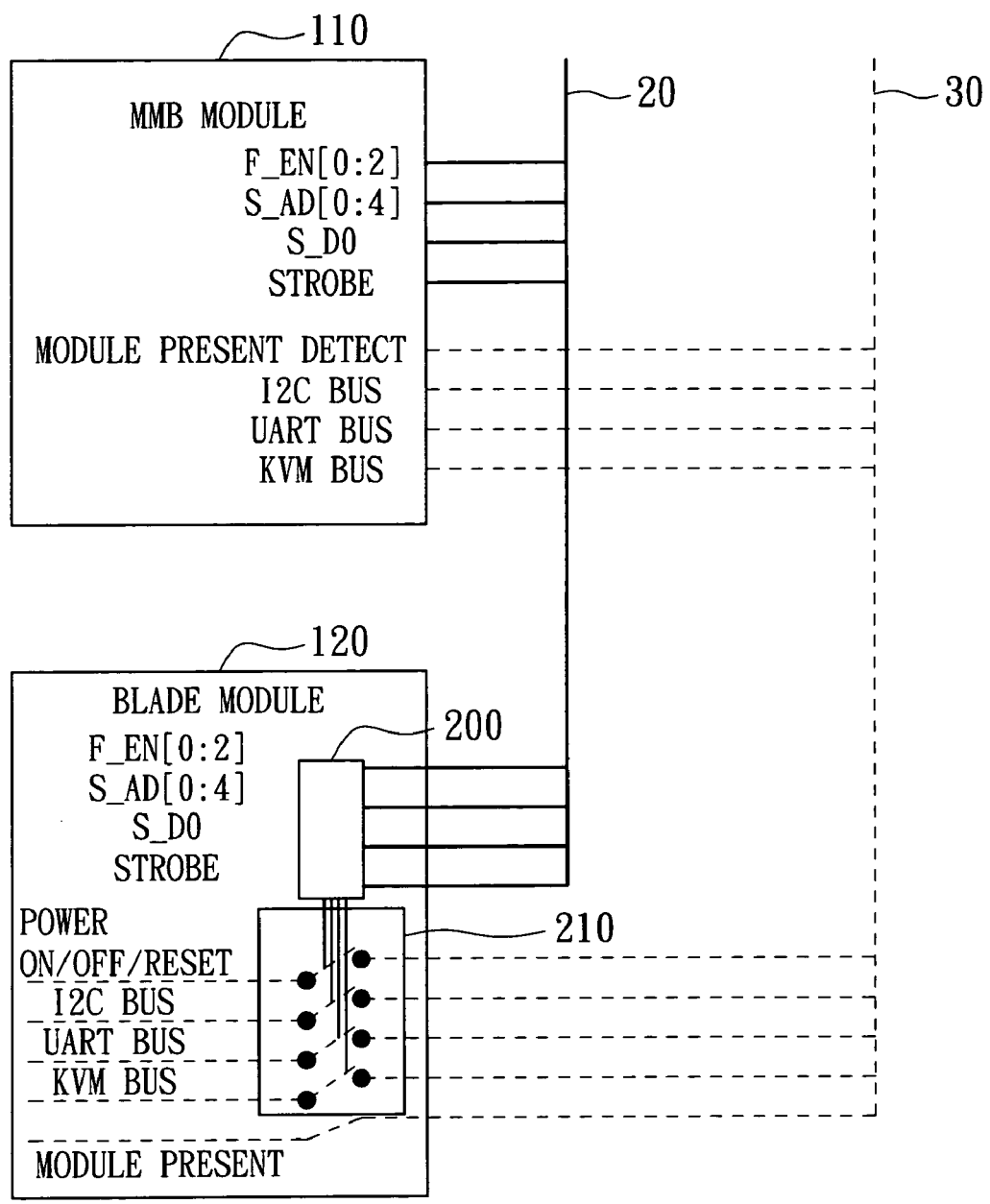
FIG. 2 illustrates the structure of a module link according to an embodiment of the invention.

FIG. 2 illustrates a structure of module interconnection in the blade server system as shown in FIG. 1 according to an embodiment of the invention. As shown in FIG. 2, the management module 110 and the processing blade module 120 are connected to the blade server system 10 through at least the management bus 20 and a functional bus, I2C bus 30 for example. As the embodiment illustrated in FIG. 1, both the management module 110 and the processing blade module 120 are removably connected to a connection board 100 for modular interconnection. The connection board 100 includes a number of communication paths for conducting signals including a signal group for the management bus and a signal group for the functional bus, such as an I2C bus 30.

The management module 110 is used for management of the blade server system 10 using signals including the management bus signal group and the I2C bus signal group. In the system, the management bus signal group has priority over other signal groups and is employed to enable the function of other signal groups selectively on the other modules. For example, the management module 10 enables the function of the I2C bus signal group on a connected module through the management bus signal group. Besides, in response to a signal indicating a module connection to the connection board received through a signal path provided by the connection board 100, for example, connectors, contacts, a wire, an optical connection, or a sensor, the management module 110 determines an address associated with the module connection through the management bus signal group and acquires module configuration information with respect to the address through the bus signal group, e.g. I2C bus signal group.

In FIG. 2, a removable module, such as the processing blade module 120, further includes a management bus interface circuit 200 which, in response to the management bus signal group, is used for selectively controlling application of power from a power source to the removable module 120 and selectively controlling activation of function of a signal group of a bus or signal groups of a number of buses, such as I2C bus, UART bus, or KVM bus, on the removable module 120. In response to the management bus signal group indicating activation of function of the first bus signal group on the removable module 120, the management bus interface circuit 200 activates function of a first bus signal group, for example, on the removable module 120. In response to the management bus signal group indicating powering on the addressed module, the management bus interface circuit 200 enables application of power from the power source to the removable module so as to power on the removable module 120. If the management module 110 determines to power on the removable module 120 using power, such as main power, from the power source, the management module 120 generates the management bus signal group indicating powering on the removable module to the removable module. In response to the management bus signal group indicating powering on the removable module to the removable module, the management bus interface circuit 200 enables application of the power, such as main power, from the power source to the removable module 120 so as to power on the removable module 120. As an example, a control circuit 210 with switching elements in response to control signals from the management bus interface circuit 200 can implement on the removable module for enabling or activation of function related to power, such as powering on, powering off, or resetting, as well as the enabling or activation of function of one or more functional buses, for example, I2C, UART, and KVM buses. In another example, the control circuit 210 and the management bus interface circuit 200 can be implemented as a bus interface device with logic circuitry in response to the management bus signal group and one or more other functional bus signal groups or specific signals on the removable module.

In one embodiment, the signal definition of the management bus includes at least four signals: (1) a function selection signal, designated as F_EN[0:2], a three-bit signal for selectively indicating at most 8 predetermined functions with respect to a module; (2) an address signal, S_AD[0:4], for selecting a module; (3) an enabling signal, S_D0, for enabling and disabling function selected; and (4) a strobe signal, STROBE, for latching signals of the management bus. In terms of the above definition of the function selection signal, three kinds of commands for module power control, module reset, and module bus selection are defined. For different functional buses, bus selection commands may include I2C bus function activation, UART bus function activation, and KVM bus function activation. These commands will be explained in the following management method according to an embodiment of the invention.

Management Method

Figure 3A:
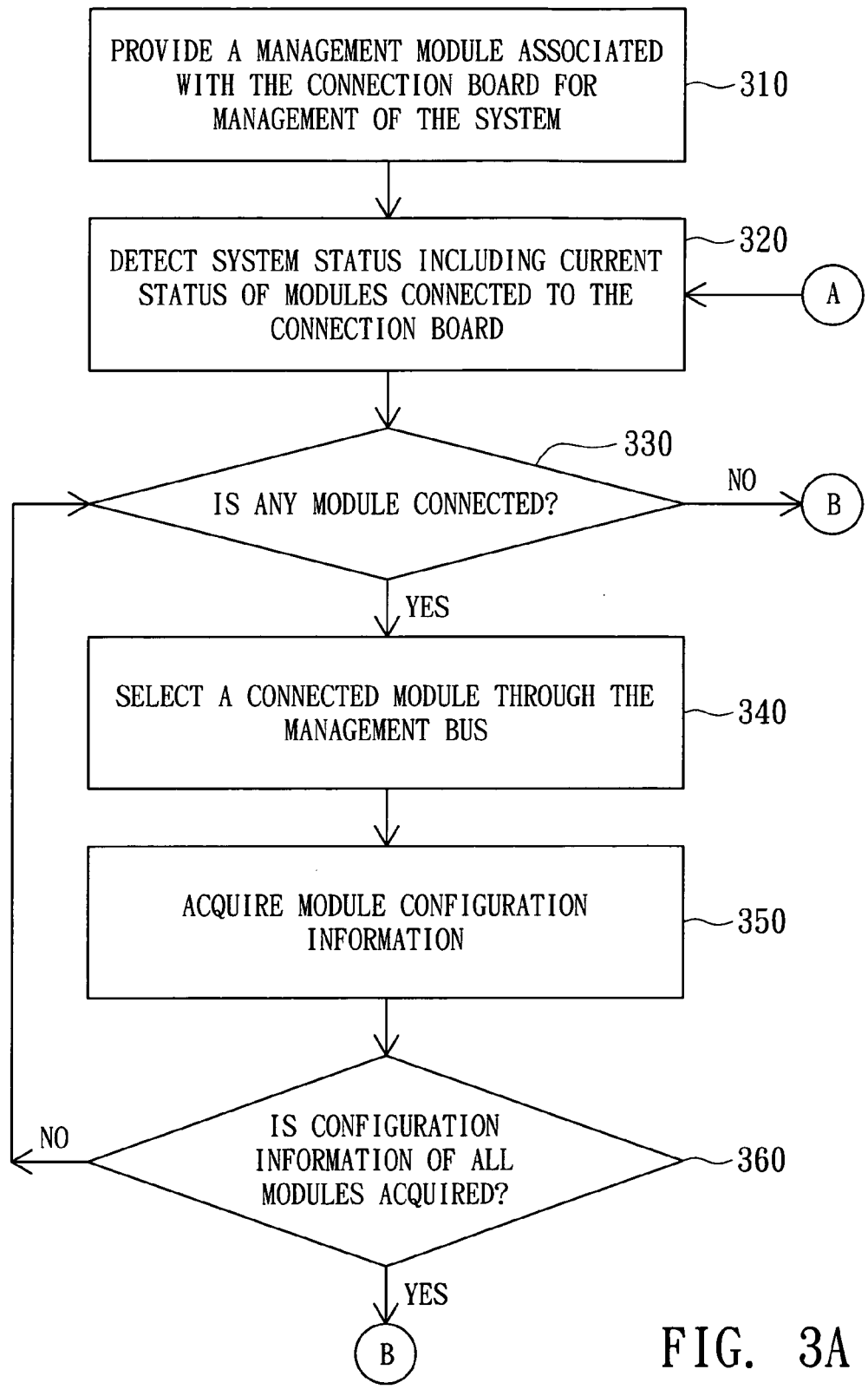
FIGS. 3A and 3B show a management method of a modular system according to an embodiment of the invention.
Figure 3B:
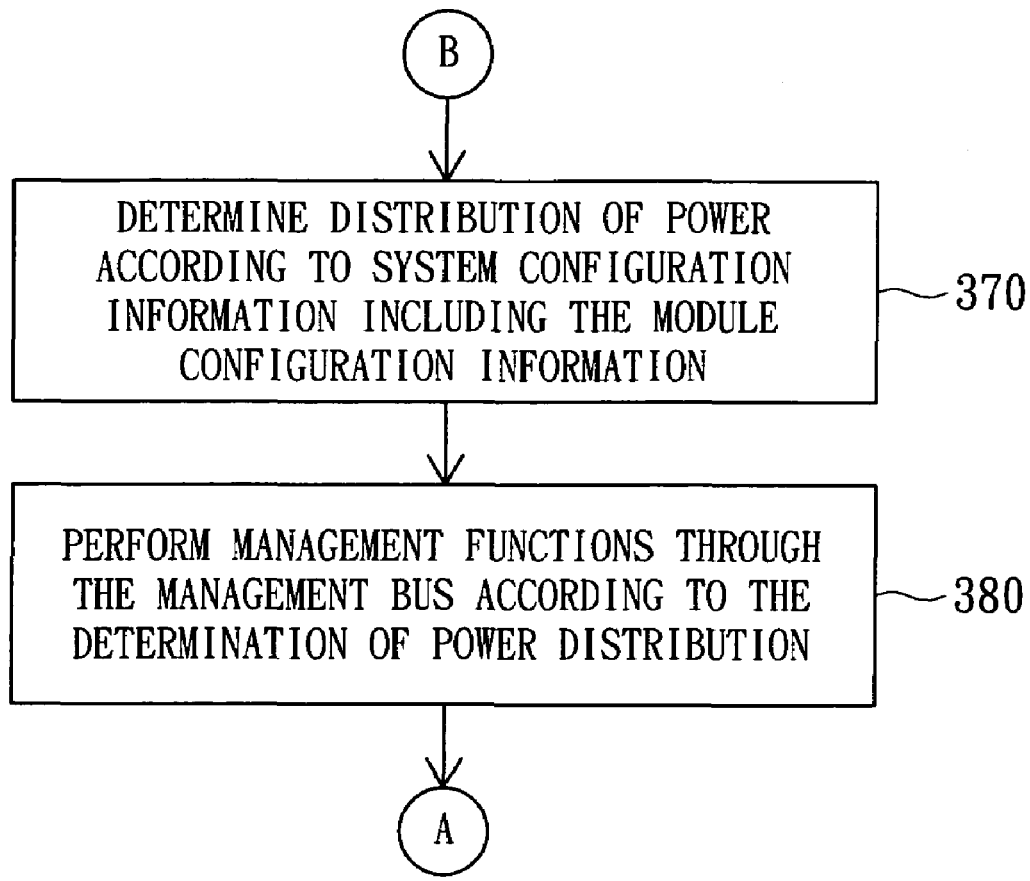

Referring to FIGS. 3A and 3B, a management method of a modular system, such as the blade server system 10 illustrated in FIG. 1, is shown according to an embodiment of the invention in flowchart form. The modular system, in general, includes a connection board for modular communication using a plurality of signal groups including a first signal group and a second signal group, such as the connection board 100 in FIG. 1, wherein the first signal group has priority over other signal groups. Accordingly, the first signal group is employed for management of the modular system.

In FIG. 3A, the method includes providing a management module associated with the connection board for management of the system using at least the first signal group and the second signal group, as indicated in step 310. In step 320, the management module begins to detect status of the modular system, the system status including status of modules connected to the connection board. Step 330 is then performed to determine whether there is any removable module connected to the connection board, for example, a module connected to the connection board before the management module is provided or a module being inserted into the connection board after the management module is provided. If a removable module is detected to be connected to the connection board, the removable module is selected through the first signal group, as shown in step 340. Next, in step 350, module configuration information with respect to the detected module is acquired through the second signal group. The management module then in step 360 detects whether configuration information of all connected modules is acquired. If not, the method repeats from steps 330 to 360 until configuration information of all connected modules is acquired. If the configuration information of all connected modules is acquired, the management module determines distribution of power from a power source to the system according to system configuration information including the acquired module configuration information, as indicated in step 370. In step 380, the management module performs management functions through the first signal group according to the determination of power distribution. After that, the method proceeds from step 320 to detect system status routinely so that the management module can be responsive to changes in configuration of the modular system.

In one example of the management method, the power source is an AC power source, the first signal group is the management bus signal group with the above signal definition and the second signal group is an I2C bus signal group. When the AC power source is applied to the modular system, the management module is activated by lower power, such as a +5V standby signal, from a power supply powered by the AC power source. In case of the presence of a module, the management enables the provision of lower power, such as +5V standby, from the AC power source on the module. When a module present signal indicating a module connecting to the connection board is detected, the management module selects the detected module, for example, by determining an address associated with the module, for example, a module identifier in the module, and sending an address signal, S_AD[0:4], indicating the module identifier on the management bus. On receiving the address signal, S_AD[0:4], the modules determine whether the address signal corresponds to their module identifiers. If one module has a module identifier corresponding to the address signal, S_AD[0:4], the module is then selected.

After the detected module is selected, the management module activates function of the I2C signal group on the selected module through the management bus signal group by sending a function selection signal, F_EN[0:2], which indicates a bus selection command for selecting the I2C bus on the selected module and sending an enabling signal, S_DO, which is asserted or enabled to indicate enabling of the bus selection indicated by the function selection signal. Enabling the I2C bus signal group on the selected module through the management bus signal group allows the management module to acquire module configuration information of the selected module via the I2C signal group. In this way, the management module acquires module configuration information of the modules present in the modular system one by one. After acquiring the current system configuration information, including module configuration information of all modules present, as well as the status of AC power source, the management module determines distribution of power from the AC power source to the modular system according to the acquired system configuration information.

Distribution of power in the modular system can be determined to meet requirements of system management, for example, in terms of prevention of a limited power resource from overloading, system stability, and/or performance. In this example, the power distribution is determined in order to prevent a limited power resource, such as the AC power source or the power supply powered by the AC power source, from being overloaded with the modular system. The management module performs management functions through the management bus according to the determination of power distribution to prevent power overloaded with the modules, for example, by generating the first signal group, indicating at least one command, according to the determination of power distribution. For example, when it is determined that the power resource would not be overloaded under the status of the current system configuration, the management module enables the provision of higher power, for example main power indicated by +12VDC signals, from the power resource for the removable modules sequentially by generating the first signal group whose function selection signal, F_EN[0:2], indicating a power-on command for module power control to enable main power on the modules, so that the modules can then be started up. Conversely, when the power resource would be overloaded or unstable under the status of the current system configuration, the determination of power distribution indicates how many and which module is ready to be powered on. The management module thus enables the provision of main power for those modules determined to be powered on by generating the first signal group whose function selection signal and address signal is set according to the determination of power distribution.

In one case, a removable module, for example, a processing blade module, has just inserted into the connection board with other modules operating. By performing the method as shown in FIGS. 3A-3B, the power distribution is then determined as to whether to turn on the inserted processing blade module in order to prevent the power resource overloaded with the modular system, according to the current system configuration detected after the insertion of that module. For example, when it is determined that the power resource would not be overloaded with respect to the current system configuration, the management module enables the provision of main power for the processing blade module by generating the first signal group whose function selection signal, F_EN[0:2], indicating a power-on command for module power control to enable main power on this module, so that the modules can then be started up. Conversely, when the power resource would be overloaded or unstable under the status of the current system configuration, the management module can decide not to enable the provision of main power for that module until the overall power loading is sufficient to do that.

In addition to the above management functions performed by the management module, management functions for KVM bus function, UART (universal asynchronous receiver-transmitter) function, module reset, and power down are presented for example.

As in the blade system 10 in FIG. 1, there is one KVM module to support all processing blade modules for KVM function. In response to a request for use of the KVM module by a specific processing blade module, the management module can use a KVM switch command by the first signal group to switch the connection of the KVM module to the specific processing blade module. In an example of a first processing blade module connecting to the KVM module and a second processing blade module requesting for use of it, the management module performs the KVM switch command by turning off the KVM bus of the first processing blade module and then turning on the KVM bus of the second processing blade module so that the second processing blade module links to the KVM module.

The blade system 10 in FIG. 1 can further connect to a console through the UART bus. In response to a request for redirection of the console to a specific processing blade module, the management module can use a UART switch command by the first signal group to switch the connection of the console to the specific processing blade module. In an example of a first processing blade module connecting to the console and a second processing blade module requesting for use of it, the management module performs the UART switch command by turning off the UART port of the first processing blade module and then turning on the UART port of the second processing blade module so that the second processing blade module links to the UART module.

When system failure or a reset event occurs, the system needs to re-power on or reset for a specific module. The management module can generate a reset command by the first signal group to reset the module or send a power off-on command by the first signal group to reboot the module through the module power control.

Further, the management module can generate a power-off command to each module sequentially by the first signal group to turn off the provision of power for all the modules.

Connection Board and Module

Figure 4:
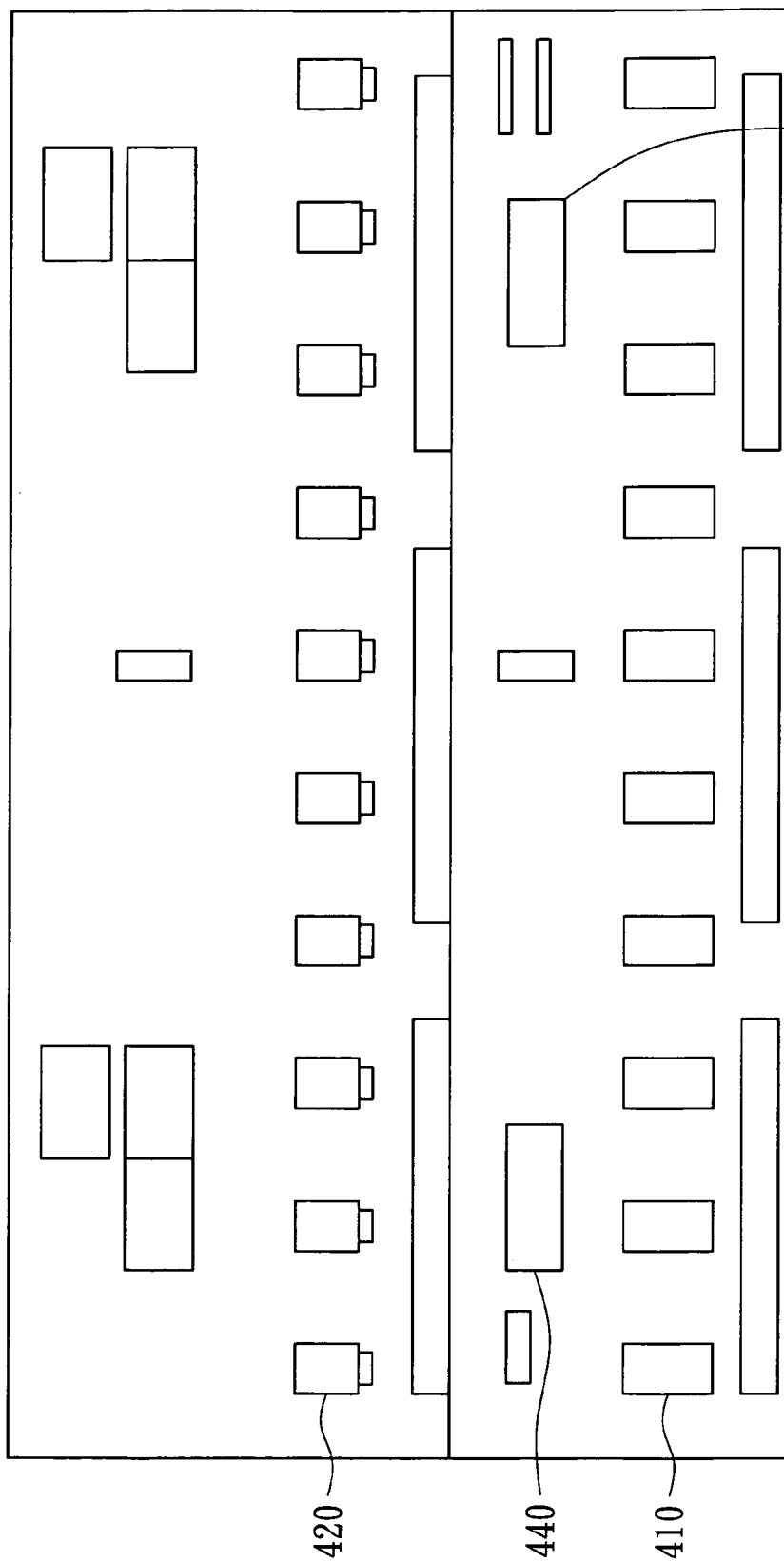
FIG. 4 shows a connection board with connectors for the connection of removable modules to the connection board, according to an embodiment of the invention.

FIG. 4 shows a connection board with connectors for the connection of removable modules to the connection board, according to an embodiment of the invention. As shown in FIG. 4, a connection board 400, for example, a printed circuit board, is equipped with a number of connectors. In this example, the connection board 400 is a midplane for removable modules to insert into or remove from, and either front side or rear side of the connection board can be equipped with connectors. Some of the connectors are for connection to removable modules and some of the connectors include contacts or pins for conducting the signal group for the management bus, wherein the signal paths are not shown for the sake of brevity. A pair of connectors, such as a lower connector 410 and an upper connector 420, on the printed circuit board 400 are for connection to a processing blade module, such as the one shown in FIG. 5.

Figure 5:
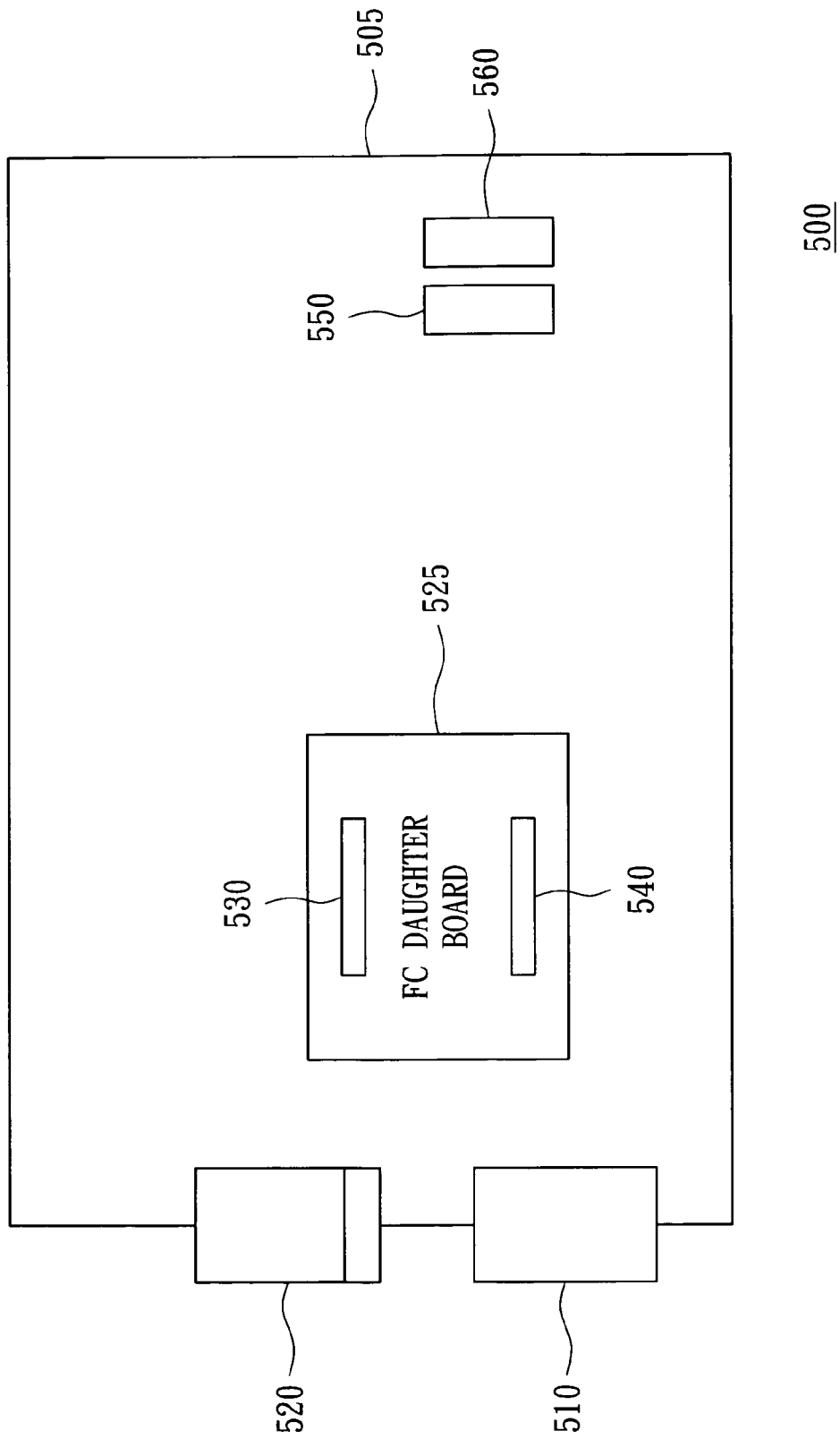
FIG. 5 shows a processing blade module equipped with two connectors for connection to the connection board shown in FIG. 3, according to an embodiment of the invention.

Referring to FIG. 5, a processing blade module is shown equipped with two connectors for connection to the connection board shown in FIG. 4. In FIG. 5, a processing blade module 500, for example a server blade with two processing units (not shown), includes three sets of connectors: (1) a lower connector 510 and an upper connector 520, correspondingly, for connection to the connection board 400; (2) an upper connector 530 and a down connector 540 for connector between a FC daughter board 525 with the main board 505 of the processing blade module 500; and (3) a first connector 550 and a second connector 560 for Perpheral Component Interconnect (PCI)-based signal bus connection.

Connectors for a Processing Blade Module

Figure 6:
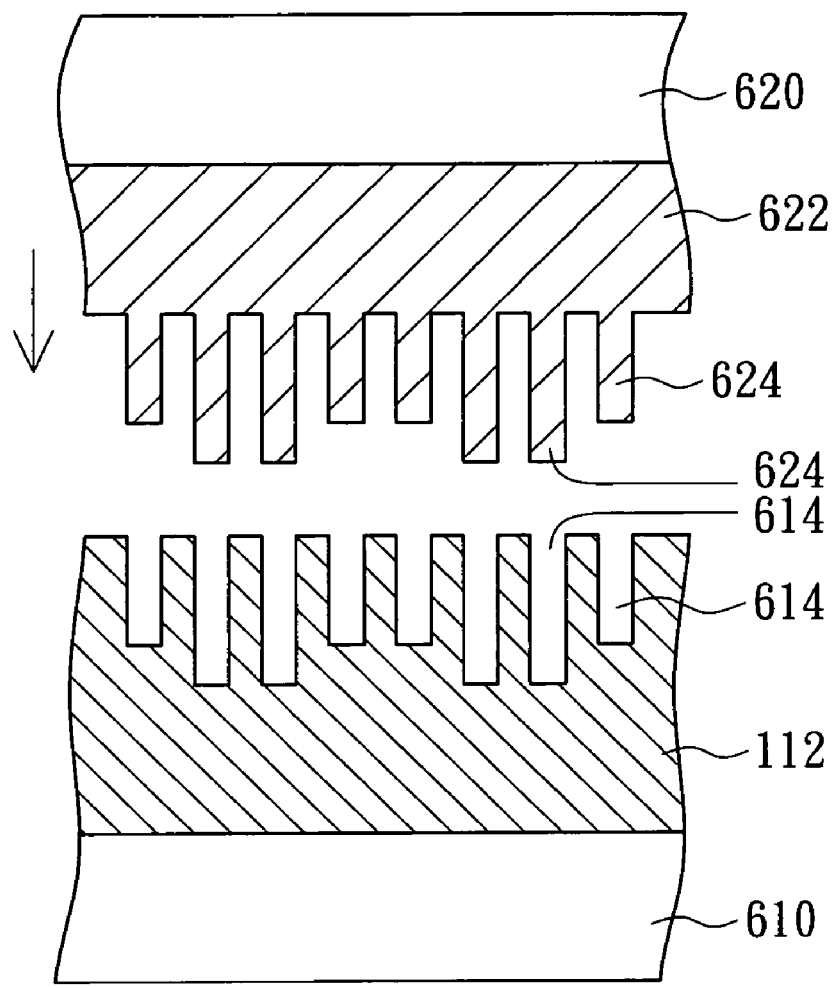
FIG. 6 is a partial, cross-sectional view illustrating connection between a server blade and a midplane of a blade server system through a second connector of the server blade and a first connector of the midplane, according to an embodiment of the invention.

Referring to FIG. 6, the connection between a server blade and a middle plane of a blade server system is illustrated, in general, through a second connector of the server blade and a first connector of the middle plane, respectively is a partial, cross-sectional view according to a preferred embodiment of the invention. In FIG. 6, a blade server system 600 includes a middle plane 610 and a server blade 620. The middle plane 610 includes a first connector 612 and the server blade 620 includes a second connector 622. The second connector 622 is used for electrically connected to the first connector 612 and has a specific number of contacts, for example, pin contacts or pins 624, for insertion into corresponding pin receptacles 614 of the first connector 612. The second connector 622 in FIG. 6 illustrates a typical one of the connectors of the 120. Different examples of pin assignment of the second connector 622 and functions will be presented below.

FIG. 7A is a pin assignment of the second connector 622 in FIG. 6 compliant with a first connector specification. The second connector 622 defined in FIG. 7A can be served as the lower connector 510 of the processing blade module 500, as shown in FIG. 5. The first connector specification complies with a Low_EPT_CONN specification, by Starconn corporation, with characteristics of hard metric 2.0 mm, 8 single rows, 2 shielding rows, female, right-angle, DIP, and 99 contacts. For example, the second connector 622 compliant with this specification can be a connector produced by Electronic Precision Technology (EPT) of model number EPT 246-31300-15. The second connector 622 includes 88 contacts, such as pins A1~A11, B1~B11, C1~C11, D1~D11, E1~E11, F1~F11, G1~G11, and H1~H11. In particular, the connector defined by FIG. 7A includes contacts H10 and H11 for conducting I2C bus signals and a specific contact A1 for outputting a module present signal indicating that the module is present when the module is connected to the connection board. In addition, contacts B3, C2, C3, D3 are for conducting the identifier of the module.

Contacts A1 is pin present for conducting a signal indicating whether the server blade is present. Contacts A2 and A3 are pins LVREQBM and LVREQBP for conducting a SCSI (small computer system interface) request signal. Contacts A4 to A9, B8, B9, E1, E2, E4, E7, F2 to F11, G2, and G9 are pins LVSCDBP11 and LVSCDBM11, LVSCDBM8 and LVSCDBP8, LVSCDBM10 and LVSCDBP10, LVSCDBM9 and LVSCDBP9, LVSCDBM5 and LVSCDBP5, LVSCDBM6, LVSCDBP6, LVSCDBM7 and LVSCDBP7, LVSCDBM0, LVSCDBP0, LVSCDBM1, LVSCDBP1, LVSCDBM2, LVSCDBP2, LVSCDBM3, LVSCDBP3, LVSCDBM4, and LVSCDBP4, LVSCDBM12, LVSCDBP12, LVSCDBM13, LVSCDBP13, LVSCDBM14, LVSCDBP14, LVSCDBM15, and LVSCDBP15 for conducting signals for SCSI channel byte signal pairs. Contacts B4 and B5 are pins LVIOBM and LVIOBP for conducting SCSI input/output signals. Contacts B6 and B7 are pins LVSELBM and LVSELBP for conducting selection signals. Contacts C4 and C5 are pins LVRSTBM and LVRSTBP for conducting SCSI reset signals. Contacts C6 and C7 are pins LVMSGBM and LVMSGBP for conducting SCSI message signals. Contacts C8 and C9 are pins LVCDBP and LVCDBM for conducting SCSI command/data signals. Contacts D4 and D5 are pins LVANTBM and LVANTBP for conducting SCSI attention signals.

Contacts D6 and D7 are pins LVBSYBM and LVBSYBP for conducting SCSI busy signals. Contacts D8 and D9 are pins LVACKBM and LVACKBP for conducting SCSI acknowledge signals. Contact E3 is pin DIFSENB for conducting a SCSI differential sense input signal. Contacts E8 and E9 are pins LVSCDBPHM and LVSCDBPHP for conducting SCSI high byte parity signals. Contacts G10 and G11 are pins LVSCDBPLM and LVSCDBPLP for conducting SCSI low byte parity signals. Contacts A10, A11, B10, B11, C10, C11, D10, D11, and E11 are pins for conducting system 12V power signals. Contact B1 is a pin for conducting a standby 5V power signal. Contact B2 is pin 5VSBY_Pre for conducting a standby 5V precharge power signal. Contacts B3, C2, C3, and D3 are pins BLD_ID1, BLD_ID0, BLD_ID2 and BLD_ID3 for indicating an identification of the server blade. Contacts C1 and D1 are two pins for conducting system 5V power signals.

Contact D2 is a pin for conducting a system 12V precharge power signal. Contact F1 is pin CMM_CTS_M for conducting a chassis management module (CMM) flow control CTS signal. Contact G1 is pin CMM_RTS_M for conducting a CMM flow control RTS signal. Contact H1 is pin D2DATA for conducting an inter-integrated circuit (I2C) bus data signal for a display interface. Contact H2 is pin D2CLK for conducting an I2C bus clock signal for a display interface. Contact H3 is pin BLD_B for conducting a display signal for blue color. Contact H4 is pin BLD_G for conducting a display signal for green color. Contact H5 is pin BLD_R for conducting a display signal for red color. Contact H6 is pin VSYNC for conducting a display vertical synchronous signal. Contact H7 is pin HSVNC for conducting a display horizontal synchronous signal. Contact H8 is pin USB− for conducting a USB negative signal. Contact H9 is pin USB+ for conducting a USB positive signal. Contact H10 is pin I2C_SCL for conducting an I2C bus clock signal. Contact H11 is pin I2C_SDA for conducting an I2C bus data signal. Contacts E10 and Y1 to Y11 is for grounding.

FIG. 7B is a pin assignment of the second connector 622 in FIG. 6 compliant with a second connector specification. The second connector 622 defined in FIG. 7B can be served as the upper connector 520 of the processing blade module 500, as shown in FIG. 5. The second connector specification complies with an Upper_5G_CONN specification by Teradyne with characteristics of High-speed differential version of Very High Density Metric (VHDM-HSD) 8-row, 2.0 mm, female, right-angle, DIP, and 92 contacts. For example, the second connector 622 compliant with this specification can be a connector produced by MOLEX of model number MOLEX 74680-0229. The second connector 622 includes 124 contacts, such as pins A1~A10, B1~B10, C1~C10, D1~D10, E1~E10, F1~F10, G1~G10, and H1~H10. In particular, the connector defined by FIG. 7B includes contacts for conducting the signal group of the management bus disclosed above. Contacts G1, H2, G2 correspond to the function selection signal, F_EN[0:2], or called local-bus function-select-enable signal. Contacts G3 to G7 correspond to the address signal, S_AD[0:4], or called local-bus data signal. Contact H3 corresponds to the enabling signal, S_D0, or called local-bus data bit. Contact H4 corresponds to the strobe signal, STROBE, or called local-bus Strobe.

Contacts A1 and B1 are pins FC_GIGA_TD1N and FC_GIGA_TD1P for conducting output signals of a Fibre Channel/GIGA local area network (LAN) differential pair 1 complementary transmitter. Contacts A2 and B2 are pins FC_GIGA_RD1N and FC_GIGA_RD1P for conducting output signals of a Fibre Channel/GIGA network differential pair 1 receiver. Contacts A3 and B3 are pins IB_RDN1_P and IB_RDP1_P for conducting input signals of an Infinite Band primary channel differential pair 1 receiver. Contacts A4 and B4 are pins IB_RDN2_P and IB_RDP2_P for conducting signals of Infinite Band primary channel differential pair 2 receiver. Contacts A5 and B5 are pins IB_RDN3_P and IB_RDP3_P for conducting signals of an Infinite Band primary channel differential pair 3 receiver. Contacts A6 and B6 are pins IB_RDN4_P and IB_RDP4_P for conducting signals of Infinite Band primary channel differential pair 4 receiver. Contacts A7 and B7 are pins IB_RDN1_S and IB_RDP1_S for conducting signals of an Infinite Band secondary channel differential pair 1 receiver. Contacts A8 and B8 are pins IB_RDN2_S and IB_RDP2_S for conducting signals of an Infinite Band secondary channel differential pair 2 receiver.

Contacts A9 and B9 are pins IB_RDN3_S and IB_RDP3_S for conducting signals of an Infinite Band secondary channel differential pair 3 receiver. Contacts A10 and B10 are pins IB_RDN4_S and IB_RDP4_S for conducting signals of an Infinite Band secondary channel differential pair 4 receiver. Contacts C1 and C10 are the pins for grounding. Contacts D1 and E1 are pins FC_GIGA_TD2N, FC_GIGA_TD2P for conducting signals of a Fibre Channel/GIGA network differential pair 2 transmitter. Contacts D2 and E2 are pins FC_GIGA_RD2N, FC_GIGA_RD2P for conducting signals of Fibre Channel/GIGA network differential pair 2 receiver. Contacts D3 and E3 are pins IB_TDN1_P and IB_TDP1_P for conducting signals of an Infinite Band primary channel differential pair 1 transmitter. Contacts D4 and E4 are pins IB_TDN2_P and IB_TDP2_P for conducting signals of an Infinite Band primary channel differential pair 2 transmitter. Contacts D5 and E5 are pins IB_TDN3_P and IB_TDP3_P for conducting signals of an Infinite Band primary channel differential pair 3 transmitter. Contacts D6 and E6 are pins IB_TDN4_P and IB_TDP4_P for conducting signals of an Infinite Band primary channel differential pair 4 transmitter.

Contacts D7 and E7 are pins IB_TDN1_S and IB_TDP1_S for conducting signals of Infinite Band secondary channel differential pair 1 transmitter. Contacts D8 and E8 are pins IB_TDN2_S and IB_TDP2_S for conducting signals of Infinite Band secondary channel differential pair 2 transmitter. Contacts D9 and E9 are pins IB_TDN3_S and IB_TDP3_S for conducting signals of Infinite Band secondary channel differential pair 3 transmitter. Contacts D10 and E10 are pins IB_TDN4_S and IB_TDP4_S for conducting signals of Infinite Band secondary channel differential pair 4 transmitter. Contacts F1 and F10 are the pins for grounding. Contact G1 is pin F_EN0 for conducting a local bus function select enable0 signal. Contact G2 is pin F_EN2 for conducting a local bus function select enable2 signal. Contacts G3 and G7 are pins S_AD0S_AD4 for conducting signals indicating local bus data bits [0:4]. Contact G8 is pin MSCLK for conducting a PS2 pointing device clock signal. Contact G9 is pin KBCLK for conducting a PS2 keyboard clock signal.

Contact G10 is pin IB_GPIO for conducting a general purpose input/output (GPIO) signal for Infinite Band primary channel. Contact H1 is pin Mated for conducting a signal for indicating whether a server blade is mated or not. Contact H2 is pin F_EN1 for conducting a local bus function select enable1 signal. Contact H3 is pin S_D0 for conducting a local bus data bit signal. Contact H4 for conducting a local bus strobe signal. Contact H5 is pin BLD_RX for conducting a chassis management module (CMM) receiving flow control signal. Contact H6 is pin BLD_TX for conducting a CMM transmission flow control signal. Contact H7 is pin CLEAR for conducting a local bus reset signal. Contact H8 is pin MSDATA for conducting a PS2 pointing device clock signal. Contact H9 is pin KBDATA for conducting a PS2 keyboard clock signal; and Contact H10 is pin IB_GPIO_S for conducting a general purpose input/output (GPIO) signal for Infinite Band primary channel.

FIG. 7C is a pin assignment of the second connector 622 in FIG. 6 compliant with a third connector specification. The second connector 622 defined in FIG. 7C can be served as the upper connector 530 of the processing blade module 500, as shown in FIG. 5. The third connector specification complies with an Upper_Daughter specification with characteristics of high speed, 0.8 mm, male, double row, differential pairs, Surface Mounted Device (SMD), and 84 contacts. For example, the second connector 622 compliant with this specification can be a connector produced by Samtec of model number QTE-042-03-F-D-DP-A. The second connector 622 includes 84 contacts.

The first and third contacts are pins FC_GIGA_TDN1 and FC_GIGA_TDP1 for conducting signals of a Fibre Channel/GIGA network differential pair 1 transmitter. The second and fourth contacts are pins FC_GIGA_RDN1 and FC_GIGA_RDP1 for conducting signals of a Fibre Channel/GIGA network differential pair 1 receiver. The fifth and seventh contacts are pins FC_GIGA_TDN2 and FC_GIGA_TDP2 for conducting signals of an Infinite Band primary channel differential pair 2 transmitter. The sixth and eighth contacts are pins FC_GIGA_RDN2 and FC_GIGA_RDP2 for conducting signals of an Infinite Band primary channel differential pair 2 receiver. The ninth and eleventh contacts are pins IB_RDN4_P and IB_RDP4_P for conducting signals of an Infinite Band primary channel differential pair 4 receiver. The tenth and twelfth contacts are pins IB_RDN4_S and IB_RDP4_S for conducting signals of an Infinite Band secondary channel differential pair 4 receiver. The thirteenth and fifteenth contacts are pins IB_RDN3_P and IB_RDP3_P for conducting signals of an Infinite Band primary channel differential pair 3 receiver. The fourteenth and sixteenth contacts are pins IB_RDN3_S and IB_RDP3_S for conducting signals of Infinite Band secondary channel differential pair 3 receiver.

The seventeenth and nineteenth contacts are pins IB_RDN2_P and IB_RDP2_P for conducting signals of Infinite Band primary channel differential pair 2 receiver. The eighteenth and twentieth contacts are pins IB_RDN2_S and IB_RDP2_S for conducting signals of Infinite Band secondary channel differential pair 2 receiver. The twenty first to twenty third contacts are pins IB_RDN1_P and IB_RDP1_P for conducting signals of Infinite Band primary channel differential pair 1 receiver. The twenty second and twenty fourth contacts are pins IB_RDN1_S and IB_RDP1_S for conducting signals of Infinite Band secondary channel differential pair 1 receiver. The twenty fifth and twenty seventh contacts are pins IB_TDN4_P and IB_TDP4_P for conducting signals of Infinite Band primary channel differential pair 4 transmitter. The twenty sixth and twenty eighth contacts are pins IB_TDN4_S and IB_TDP4_S for conducting signals of Infinite Band secondary channel differential pair 4 transmitter. The twenty ninth and thirty first contacts are pins IB_TDN3_P and IB_TDP3_P for conducting signals of Infinite Band primary channel differential pair 3 transmitter. The thirtieth and thirty second contacts are pins IB_TDN3_S and IB_TDP3_S for conducting signals of Infinite Band secondary channel differential pair 3 transmitter.

The thirty third and thirty fifth contacts are pins IB_TDN2_P and IB_TDP2_P for conducting signals of Infinite Band primary channel differential pair 2 transmitter. The thirty fourth and thirty sixth contacts are pins IB_TDN2_S and IB_TDP2_S for conducting signals of Infinite Band secondary channel differential pair 2 transmitter. The thirty seventh and thirty ninth contacts are pins IB_TDN1_P and IB_TDP1_P for conducting signals of Infinite Band primary channel differential pair 1 transmitter. The thirty eighth and fortieth contacts are pins IB_TDN1_S and IB_TDP1_S for conducting signals of Infinite Band secondary channel differential pair 1 transmitter. The forty first contact is pin GB_LED for conducting a signal for indicating GIGA network operation. The forty second contact is pin IB_GPIO_P for conducting a GPIO signal for Infinite Band primary channel. The forty third contact is pin FC_LED for conducting a signal for indicating fiber channel operation. The forty fourth contact is pin IB_GPIO_S for conducting a GPIO signal for Infinite Band secondary channel. The forty fifth and forth seventh contacts are pins EXPB__100 MHz_CLK_P and EXPB__100 MHz_CLK_N for conducting clock differential pair receiving signals for PCI Express B channel. The forty sixth contact is pin SMB4_CLK for conducting a system management bus clock signal.

The forty eight contact is pin SMB4_DTA for conducting a system management bus data signal. The forth ninth and fifty first contacts are pins EXPB_RXP0 and EXPB_RXN0 for conducting differential pair 0 receiver for PCI Express B channel. The fifty and fifty second contacts are pins EXPB_TXP0 and EXPB_TXN0 for conducting differential pair 0 transmitter for PCI Express B channel. The fifty third and fifty fifth contacts are pins EXPB_RXP1 and EXPB_RXN1 for conducting differential pair 1 receiver for PCI Express B channel. The fifty fourth and fifty sixth contacts are pins EXPB_TXP1 and EXPB_TXN1 for conducting differential pair 1 transmitter for PCI Express B channel. The fifty seventh and fifty ninth contacts are pins EXPB_RXP2 and EXPB_RXN2 for conducting differential pair 2 receiver for PCI Express B channel. The fifty eighth and sixtieth contacts are pins EXPB_TXP2 and EXPB_TXN2 for conducting differential pair 2 transmitter for PCI Express B channel. The sixty first and sixty third contacts are pins EXPB_RXP3 and EXPB_RXN3 for conducting differential pair 3 receiver for PCI Express B channel. The sixty second and sixty fourth contacts are pins EXPB_TXP3 and EXPB_TXN3 for conducting differential pair 3 transmitter for PCI Express B channel.

The sixty fifth and sixty seventh contacts are pins EXPB_RXP4 and EXPB_RXN4 for conducting differential pair 4 receiver for PCI Express B channel. The sixty sixth and sixty eighth contacts are pins EXPB_TXP4 and EXPB_TXN4 for conducting differential pair 4 transmitter for PCI Express B channel. The sixty ninth and seventy first contacts are pins EXPB_RXP5 and EXPB_RXN5 for conducting differential pair 5 receiver for PCI Express B channel. The seventieth and seventy second contacts are pins EXPB_TXP5 and EXPB_TXN5 for conducting differential pair 5 transmitter for PCI Express B channel. The seventy third and seventy fifth contacts are pins EXPB_RXP6 and EXPB_RXN6 for conducting differential pair 6 receiver for PCI Express B channel. The seventy fourth and seventy sixth contacts are pins EXPB_TXP6 and EXPB_TXN6 for conducting differential pair 6 transmitter for PCI Express B channel. The seventy seventh and seventy ninth contacts are pins EXPB_RXP7 and EXPB_RXN7 for conducting differential pair 7 receiver for PCI Express B channel. The seventy eighth and eightieth contacts are pins EXPB_TXP7 and EXPB_TXN7 for conducting differential pair 7 transmitter for PCI Express B channel. The eighty first contact is pin SYS_PWRGD2 for conducting a system power good signal. The eighty second contact is pin WAKE_N for conducting a local area network (LAN) wake-up signal. The eighty third and eighty fourth contacts are two pins for grounding. Contacts G1 to G12 are the pins for grounding.

FIG. 7D is a pin assignment of the second connector 622 in FIG. 6 compliant with a fourth connector specification. The second connector 622 defined in FIG. 7D can be served as the down connector 540 of the processing blade module 500, as shown in FIG. 5. The fourth connector specification complies with a Down_Daughter specification with characteristics of high speed, 0.8 mm, male, double row, SMD, and 120 contacts. For example, the second connector 622 compliant with this specification can be a connector produced by Samtec of model number QTE-060-03-F-D-D-A. The second connector 622 includes a first pin to a $120^{th}$ pin, 120 contacts.

The first to ninth contacts are pins P2_AD27, P2_AD31, P2_AD26, P2_AD30, P2_AD25, P2_AD29, P2_AD24, P2_AD28 and P2_AD23 for conducting signals for PCI address/data. The $11^{th}$, $13^{th}$, $15^{th}$, $17^{th}$, $19^{th}$, $21^{st}$, $23^{rd}$, $25^{th}$, $27^{th}$, and $29^{th}$ are pins P2_AD22, P2_AD21, P2_AD20, P2_AD19, P2_AD18, P2_AD17, P2_AD16, P2_AD15, P2_AD14 and P2_AD13 for conducting signals for PCI address/data. The $31^{st}$, $33^{rd}$, $35^{th}$, $37^{th}$, $39^{th}$, $41^{st}$, $43^{rd}$, $45^{th}$, $47^{th}$, and $49^{th}$ are pins P2_AD12, P2_AD11, P2_AD10, P2_AD9, P2_AD8, P2_AD7, P2_AD6, P2_AD5, P2_AD4 and P2_AD3 for conducting signals for PCI address/data.

The $51^{st}$, $53^{rd}$, $55^{th}$, $57^{th}$, $59^{th}$, $61^{st}$, $63^{rd}$, $65^{th}$, $67^{th}$, and $69^{th}$ are pins P2_AD2, P2_AD1, P2_AD0, P2_AD63, P2_AD62, P2_AD61, P2_AD60, P2_AD59, P2_AD58 and P2_AD57 for conducting signals for PCI address/data. The $71^{st}$, $73^{rd}$, $75^{th}$, $77^{th}$, $79^{th}$, $81^{st}$, $83^{rd}$, $85^{th}$, $87^{th}$ and $89^{th}$ are pins P2_AD56, P2_AD55, P2_AD54, P2_AD53, P2_AD52, P2_AD51, P2_AD50, P2_AD49, P2_AD48 and P2_AD47 for conducting signals for PCI address/data.

The $91^{st}$, $93^{rd}$, $95^{th}$, $97^{th}$, $99^{th}$, $101^{st}$, $103^{rd}$, $105^{th}$, $107^{th}$, $109^{th}$, $111^{st}$, $113^{rd}$, $115^{th}$, $117^{th}$, and $119^{th}$ are pins P2_AD46, P2_AD45, P2_AD44, P2_AD43, P2_AD42, P2_AD41, P2_AD40, P2_AD39, P2_AD38, P2_AD37, P2_AD36, P2_AD35, P2_AD34, P2_AD33, and P2_AD32 for conducting signals for PCI address/data. The contacts G1 to G12 are pins for grounding. The $10^{th}$ contact is pin FC_PRESENT_N for conducting a signal for indicating fiber channel present. The $12^{th}$, $14^{th}$, $84^{th}$, and $86^{th}$ contacts are pins PCIIRQ-L7, PCIIRQ-L6, PCIIRQ-L10, PCIIRQ-L9 for conducting PCI interrupt signals.

The $16^{th}$ contact is pin PCIX_CLK1 for conducting a PCI clock signal. The $18^{th}$ contact is pin PCIX_RST-L for conducting a PCI reset signal. The $20^{th}$ contact is pin P2_PGNT-L0 for conducting a PCI grant bus 0 signal. The $22^{th}$ contact is pin P_REQ-L0 for conducting a PCI request bus 0 signal. The $24^{th}$ contact is pin P2_PAR for conducting a PCI parity signal. The $26^{th}$ contact is pin P2 STOP-L for conducting a PCI stop signal. The $28^{th}$ contact is pin P2_DEVSEL-L for conducting a PCI device selection signal. The $30^{th}$ contact is pin P2 TRDY-L for conducting a PCI target ready signal. The $32^{nd}$ contact is pin P2_IRDY-L for conducting a PCI initiator ready signal. The $34^{th}$ contact is pin P2_FREAME-L for conducting a PCI frame signal.

The $36^{th}$ contact is pin P2_SERR-L for conducting a PCI system error signal. The $38^{th}$ contact is pin P2_PERR-L for conducting a PCI parity error signal. The $40^{th}$ contact is pin SMBO_SCL for conducting an I2C clock signal. The $42^{nd}$, $44^{th}$, $46^{th}$, and $66^{th}$ contacts are pins P2_CBE-L3, P2_CBE-L2, P2_CBE-L1, P2_CBE-L0, P2_CBE-L7, P2_CBE-L6, P2_CBE-L5, P2_CBE-L4 for PCI bus command and byte enable signals. The $50^{th}$ contact is pin P2_M66EN for conducting a 66 Mhz enable signal. The $52^{th}$ contact is pin P2_ACK64-L for conducting a 64-bit acknowledge transfer signal.

The $54^{th}$ contact is pin P2_REQ64 for conducting a 64-bit request transfer signal. The $56^{th}$ contact is pin P2_PAR64 for conducting a 64-bit parity check signal. The $58^{th}$ contact is pin SMBO_SDA for conducting an I2C data signal. The $68^{th}$ contact is pin PCIXCAP for conducting a PCI-X capable signal. The $70^{th}$ contact is pin P_REQ-L2 for conducting a PCI request bus 2 signal. The $72^{th}$ contact is in PCIXCLK2 for conducting a PCI grant bus 2 signal. The $74^{th}$ contact is pin PCIX_CLK2 for conducting a PCI clock signal. The $76^{th}$ contact is pin IDSEL2 for conducting an initialization device selection 2 signal. The $78^{th}$ contact is pin IDSEL1 for conducting an initialization device selection 1 signal. The $80^{th}$ contact is pin P2_LOCK-L for conducting a PCI lock signal.

The $82^{th}$ contact is pin RESERVE_PME-L for conducting a PCI power management event (PME) signal. The $88^{th}$ contact is pin SCSI_IRQB-L for conducting a SCSI interrupt B signal. The $90^{th}$ contact is pin SCSI_IRQA-L for conducting a SCSI interrupt A signal. The $92^{th}$ contact is pin ZCR_PRESENT-L for conducting a zero crossing (ZCR) present signal. The $94^{th}$ contact is pin ZCR_GNT-L for conducting a ZCR grant bus signal. The $96^{th}$ contact is pin VCC5SBY for conducting a standby 5V power signal. The $98^{th}$ contact is pin VCC3_3SBY for conducting a standby 3.3V power signal. The $100^{th}$, $102^{nd}$, $104^{th}$, and $106^{th}$ contacts are pins for conducting system 5V power signals. The $108^{th}$, $110^{th}$, $112^{nd}$, $114^{th}$, $116^{th}$, and $118^{th}$ contacts are pins for conducting system 3.3V power signals. The $120^{th}$ contact is a pin for conducting a system 12V power signal.

FIG. 7E is a pin assignment of the second connector 622 in FIG. 6 compliant with a fifth connector specification. The second connector 622 defined in FIG. 7E can be served as the first connector 510 of the processing blade module 550, as shown in FIG. 5. The fifth connector specification complies with a PCI_Base_Conn specification with characteristics of high speed, 0.8 mm, male, double row, SMD, and 40 contacts. For example, the second connector 622 compliant with this specification can be a connector produced by Samtec of model number QTE-020-03-F-D-A. The second connector 622 includes 40 contacts, such as a first pin to a $40^{th}$ pin.

The first contact is pin SERR for conducting a PCI system error signal. The second contact is pin PERR for conducting a PCI parity error signal. The fourth contact is pin SMB_CLK2 for conducting a system management bus clock signal. The sixth contact is pin SMB_DATA2 for conducting a system management bus data signal. The third, fifth, seventh, eighth, $13^{th}$ to $16^{th}$, $22^{nd}$, $23^{rd}$, and $31^{st}$ to $35^{th}$ contacts are the pins for grounding.

The ninth to $12^{th}$ contacts are pins for conducting system 12V power signals. The $17^{th}$ to $21^{st}$ contacts are pins for conducting system 3.3V power signals. The $24^{th}$, $26^{th}$, $28^{th}$, and $30^{th}$ contacts are pins for conducting system 5V power signals. The $25^{th}$, $27^{th}$, and $29^{th}$ contacts pins for conducting system 1.5V power signals. The $36^{th}$ and $38^{th}$ contacts are pins 3V3STB for standby 3.3V power signals. The $37^{th}$ contact is pin PRESENT1 for conducting a PCI present 1 signal. The $39^{th}$ contact is pin PRESENT2 for conducting a PCI present 2 signal. The $40^{th}$ contact is pin PME for conducting a PCI power management event (PME) signal.

FIG. 2F is another pin assignment of the second connector 622 in FIG. 6 compliant with the fifth connector specification. The second connector 622 defined in FIG. 7F can be served as the second connector 560 of the processing blade module 500, as shown in FIG. 5. The fifth connector specification complies with a PCI_Base_Conn specification with characteristics of high speed, 0.8 mm, male, double row, SMD, and 40 contacts. For example, the second connector 622 compliant with this specification can be a connector produced by Samtec of model number QTE-020-03-F-D-A. The second connector 622 includes 40 contacts, such as a first pin to a $40^{th}$ pin.

The first and third contacts are pins EXPA_TX_N1 and EXPA_TX_P1 for conducting signals of differential pair 1 transmitter for PCI Express channel A. The second contact is pin PRESENT for conducting a PCI base board present signal. The fourth contact is pin PCI_RST for conducting a PCI bus reset signal. The fifth, $11^{th}$, $17^{th}$, $23^{rd}$, $29^{th}$, $30^{th}$, $35^{th}$, $36^{th}$ contacts are pins for grounding. The sixth contact is pin SYSTEM_PWR_OK for conducting a system power normal signal. The seventh and ninth contacts are pins EXPA_RX_P3 and EXPA_RX_N3 for conducting signals of differential pair 3 receiver for PCI Express channel A. The eighth contact is pin SMB_CLK for conducting a system management bus clock signal. The tenth contact is pin SMB_DATA for conducting a system management bus data signal. The twelfth contact is a pin for conducting a system 12V power signal. The $13^{th}$ and $15^{th}$ contacts are pins EXPA_TX_P3 and EXPA_TX_N3 for conducting signals of differential pair 3 transmitter for PCI Express channel A. The $14^{th}$ conducting system 3.3V power signals. The $19^{th}$ and $21^{th}$ contacts for conducting signals are pins EXPA_RX_N2 and EXPA_RX_P2 of differential pair 2 transmitter for PCI Express channel A. The $24^{th}$ contact is pin 3V3STB for conducting a standby 3.3V power signal. The $25^{th}$ and $27^{th}$ contacts are pins EXPA_TX_P0 and EXPA_TX_N0 for conducting signals of differential pair 0 transmitter for PCI Express channel A. The $26^{th}$ and $28^{th}$ contacts are pins for conducting system 1.5V power signals. The $31^{st}$ and $33^{rd}$ contacts armme pins EXPA_RX_N0 and EXPA_RX_P0 for conducting signals of differential pair 0 receiver for PCI Express channel A. The $32^{nd}$ and $34^{th}$ contacts are pins EXPA_TX_N2 and EXPA_TX_P2 for conducting signals of differential pair 2 transmitter for PCI Express channel A. The $37^{th}$ and $39^{th}$ contacts are pins EXPA_RX_N1 and EXPA_RX_P1 for conducting signals of differential pair 1 receiver for PCI Express channel A. The $38^{th}$ and $40^{th}$ contacts are pins EXPA_CLOCK_N and EXPA_CLOCK_P for conducting clock differential pair receiving signals for PCI Express channel A.

Connectors for a Management Module

Referring to FIG. 4, each of two connectors 430 and 440 of the connection board 400 is for connection to a management module and the connectors 430 and 440 are disposed on the rear side, for example. The blade server system can work properly with at least one management module. In the case of two management modules connecting to the connection board 400 through the connectors 430 and 440 respectively, one of the management modules is the master and the other one is the slave. The connector 430 or 440 can be implemented by a 2.0 mm hard metric connector of 95 pins, manufactured by FCI.

Corresponding to the blade server system 10 illustrated in FIG. 1, contacts of the connector 430 can be used to conducting signals, for example, I2C buses signals, module present signals, management bus signals, UART bus signals, power supply unit (PSU) signals, and other I/O signals. For the I2C buses, there are plurality of I2C buses for communication between the management module and each of the modules, such as processing blade modules, network switch modules, power supply unit modules, fan modules, and KVM modules. The connectors for the removable modules, such as processing blade modules, power supply modules, fan modules, I/O modules, and KVM modules, in the example, include a contact for indicating the respective module present signals for the modules, in order to inform the management module of the present of the modules inserted into the connection board. The connector 430 thus includes contacts for receiving the module present signals. These module present signals for these modules can be transferred to the management module through signal paths on the connection board. In addition, the contacts of the connector 430 for power supply unit signals are used for controlling the power supply units connected to the connection board and receiving power status signals, such as power-OK signals or early power-off signals, from the power supply units.

Contacts of the connector 430 for other I/O signals may be used to receiving the present signal of another management module and transmitting the present signal of the management module connected to the connection board with the connector 430 to the another management signal and receiving a signal from the other management module for identifying whether the management module with the connector 430 is the master or slave.

In brief, the management module can receive various information from the removable modules through the connector 430 and use the information for management of the blade server system. For example, the temperature signals measured in different sides of the connection board can also be applied to the management module through a contact of the connector 430. The management module can determine whether to control the fan modules according to the temperature signals acquired through the signal path for the temperature signals.

The management bus has priority over the other functional buses, such as I2C buses, and UART buses. The connectors for the respective removable modules, such as V-KVM module, processing blade module, and network modules, on the connection board have contacts dedicated for conducting the management bus signal group.

As above, a blade server system with a management bus and method for management thereof are disclosed by the embodiments according to the invention. Distribution of power from a power source to the blade server system can be determined according to the system configuration information including the module configuration information with respect to the associated modules so that the power source is prevented from being overloaded with the blade server system. The risk of unpredictable shutdown of the blade server system due to power impact can be avoided. In addition, management functions can be performed using the management bus, thereby achieving optimum performance.

While the invention has been described by way of example and in terms of embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A blade server system, comprising:
a middle plane board including a first connector; and
a server blade including a second connector for being electrically connected to the first connector, the second connector including a plurality of contacts in compliance with a connector specification, the contacts including:
contact A1 for conducting a signal indicating whether the server blade is present;
contacts A2 and A3 for conducting a SCSI (small computer system interface) request signal;
contacts A4 to A9, B8, B9, E1, E2, E4, E7, F2 to F11, G2, and G9 for conducting signals for SCSI channel byte signal pairs;
contacts B4 and B5 for conducting SCSI input/output signals;
contacts B6 and B7 for conducting selection signals;
contacts C4 and C5 for conducting SCSI reset signals;
contacts C6 and C7 for conducting SCSI message signals;
contacts C8 and C9 for conducting SCSI command/data signals;
contacts D4 and D5 for conducting SCSI attention signals;
contacts D6 and D7 for conducting SCSI busy signals;
contacts D8 and D9 for conducting SCSI acknowledge signals;
contact E3 for conducting a SCSI differential sense input signal;
contacts E8 and E9 for conducting SCSI high byte parity signals;
contacts G10 and G11 for conducting SCSI low byte parity signals;
contacts A10, A11, B10, B11, C10, C11, D10, D11, and E11 for conducting system 12V power signals;
contact B1 for conducting a standby 5V power signal;
contact B2 for conducting a standby 5V precharge power signal;
contacts B3, C2, C3, and D3 for indicating an identification of the server blade;
contacts C1 and D1 for conducting system 5V power signals;
contact D2 for conducting a system 12V precharge power signal;
contact F1 for conducting a chassis management module (CMM) flow control Clear To Send (CTS) signal;
contact G1 for conducting a CMM flow control Request To Send (RTS) signal;
contact H1 for conducting an inter-integrated circuit (I2C) bus data signal for a display interface;
contact H2 for conducting an I2C bus clock signal for a display interface;
contact H3 for conducting a display signal for blue color;
contact H4 for conducting a display signal for green color;
contact H5 for conducting a display signal for red color;
contact H6 for conducting a display vertical synchronous signal;
contact H7 for conducting a display horizontal synchronous signal;
contact H8 for conducting a Universal Serial Bus (USB) negative signal;
contact H9 for conducting a USB positive signal;
contact H10 for conducting an I2C bus clock signal;
contacts E10 and Y1 to Y11 for grounding; and
contact H11 for conducting a I2C bus data signal.

2. The blade server system according to claim 1, wherein the connector specification complies with a Low_EPT_CONN specification with characteristics of hard metric 2.0 mm, 8 single rows, 2 shielding rows, female, right-angle, Dual-Inline-Package (DIP), and 99 contacts.

3. A blade server system, comprising:
a middle plane board for modular interconnection, including a first connector, the first connector including a plurality of contacts for conducting a management bus signal group for management of the blade server system; and
a server blade including a second connector for being electrically connected to the first connector, the second connector including a plurality of contacts in compliance with a connector specification, the contacts including:
contacts A1 and B1 for conducting signals of a Fibre Channel/GIGA network differential pair 1 transmitter;
contacts A2 and B2 for conducting signals of a Fibre Channel/GIGA network differential pair 1 receiver;
contacts A3 and B3 for conducting signals of an InfiniBand primary channel differential pair 1 receiver;
contacts A4 and B4 for conducting signals of an InfiniBand primary channel differential pair 2 receiver;
contacts A5 and B5 for conducting signals of an InfiniBand primary channel differential pair 3 receiver;
contacts A6 and B6 for conducting signals of an InfiniBand primary channel differential pair 4 receiver;
contacts A7 and B7 for conducting signals of an InfiniBand secondary channel differential pair 1 receiver;
contacts A8 and B8 for conducting signals of an InfiniBand secondary channel differential pair 2 receiver;
contacts A9 and B9 for conducting signals of an InfiniBand secondary channel differential pair 3 receiver;
contacts A10 and B10 for conducting signals of an InfiniBand secondary channel differential pair 4 receiver;
contacts C1 and C10 for grounding;
contacts D1 and E1 for conducting signals of a Fibre Channel/GIGA network differential pair 2 transmitter;
contacts D2 and E2 for conducting signals of a Fibre Channel/GIGA network differential pair 2 receiver;
contacts D3 and E3 for conducting signals of an InfiniBand primary channel differential pair 1 transmitter;
contacts D4 and E4 for conducting signals of an InfiniBand primary channel differential pair 2 transmitter;
contacts D5 and E5 for conducting signals of an InfiniBand primary channel differential pair 3 transmitter;
contacts D6 and E6 for conducting signals of an InfiniBand primary channel differential pair 4 transmitter;
contacts D7 and E7 for conducting signals of an InfiniBand secondary channel differential pair 1 transmitter;
contacts D8 and E8 for conducting signals of an InfiniBand secondary channel differential pair 2 transmitter;
contacts D9 and E9 for conducting signals of an InfiniBand secondary channel differential pair 3 transmitter;
contacts D10 and E10 for conducting signals of an InfiniBand secondary channel differential pair 4 transmitter;
contacts F1 and F10 for grounding;
contact G1 for conducting a local bus function select enable0 signal;
contact G2 for conducting a local bus function select enable2 signal;
contacts G3 and G7 for conducting signals indicating local bus data bits [0:4];
contact G8 for conducting a PS2 pointing device clock signal;
contact G9 for conducting a PS2 keyboard clock signal;
contact G10 for conducting a general purpose input/output (GPIO) signal for an InfiniBand primary channel;
contact H1 for conducting a signal for indicating whether a server blade is mated or not;
contact H2 for conducting a local bus function select enable1 signal;
contact H3 for conducting a local bus data bit signal;
contact H4 for conducting a local bus strobe signal;
contact H5 for conducting a chassis management module (CMM) receiving flow control signal;
contact H6 for conducting a CMM transmission flow control signal;
contact H7 for conducting a local bus reset signal;
contact H8 for conducting a PS2 pointing device clock signal;
contact H9 for conducting a PS2 keyboard clock signal; and
contact H10 for conducting a general purpose input/output(GPIO) signal for an InfiniBand primary channel,
wherein the management bus signal group includes the local bus function select enable0 signal, the local bus function select enable1 signal, the local bus function select enable2 signal, the signals indicating local bus data bits [0:4], the local bus data bit signal, and the local bus strobe signal.

4. The blade server system according to claim 3, the connector specification complies with an Upper_5G_CONN specification with characteristics of High-speed differential version of Very High Density Metric (VHDM-HSD) 8 row, 2.0 mm, female, right-angle, Dual-Inline-Package(DIP), and 92 contacts.

5. A blade server system, comprising:
a middle plane board including a first connector; and
a server blade including a second connector for being electrically connected to the first connector, the second connector including a plurality of contacts in compliance with a connector specification, the contacts including:
first and third contacts for conducting signals of
a Fibre Channel/GIGA network differential pair 1 transmitter;
second and fourth contacts for conducting signals of a Fibre Channel/GIGA network differential pair 1 receiver;
fifth and seventh contacts for conducting signals of an InfiniBand primary channel differential pair 2 transmitter;
sixth and eighth contacts for conducting signals of an InfiniBand primary channel differential pair 2 receiver;
ninth and eleventh contacts for conducting signals of InfiniBand primary channel differential pair 4 receiver;
tenth and twelfth contacts for conducting signals of an InfiniBand secondary channel differential pair 4 receiver;
thirteenth and fifteenth contacts for conducting signals of an InfiniBand primary channel differential pair 3 receiver;

fourteenth and sixteenth contacts for conducting signals of an InfiniBand secondary channel differential pair 3 receiver;

seventeenth and nineteenth contacts for conducting signals of an InfiniBand primary channel differential pair 2 receiver;

eighteenth and twentieth contacts for conducting signals of an InfiniBand secondary channel differential pair 2 receiver;

twenty-first and twenty-third contacts for conducting signals of an InfiniBand primary channel differential pair 1 receiver;

twenty-second and twenty-fourth contacts for conducting signals of an InfiniBand secondary channel differential pair 1 receiver;

twenty-fifth and twenty-seventh contacts for conducting signals of an InfiniBand primary channel differential pair 4 transmitter;

twenty-sixth and twenty-eighth contacts for conducting signals of an InfiniBand secondary channel differential pair 4 transmitter;

twenty-ninth and thirty-first contacts for conducting signals of an InfiniBand primary channel differential pair 3 transmitter;

thirtieth and thirty-second contacts for conducting signals of an InfiniBand secondary channel differential pair 3 transmitter;

thirty-third and thirty-fifth contacts for conducting signals of an InfiniBand primary channel differential pair 2 transmitter;

thirty-fourth and thirty-sixth contacts for conducting signals of an InfiniBand secondary channel differential pair 2 transmitter;

thirty-seventh and thirty-ninth contacts for conducting signals of an InfiniBand primary channel differential pair 1 transmitter;

thirty-eighth and fortieth contacts for conducting signals of an InfiniBand secondary channel differential pair 1 transmitter;

a forty-first contact for conducting a signal for indicating GIGA network operation;

a forty-second contact for conducting a General Purpose Input Output (GPIO) signal for an InfiniBand primary channel;

a forty-third contact for conducting a signal for indicating fiber channel operation;

a forty-fourth contact for conducting a GPIO signal for an InfiniBand secondary channel;

forty-fifth and forty-seventh contacts for conducting clock differential pair receiving signals for a Peripheral Component Interconnect (PCI) Express B channel;

a forty-sixth contact for conducting a system management bus clock signal;

a forty-eight contact for conducting a system management bus data signal;

forty-ninth and fifty-first contacts for conducting signals of a differential pair 0 receiver for PCI Express B channel;

fifty and fifty-second contacts for conducting signals of a differential pair 0 transmitter for PCI Express B channel;

fifty-third and fifty-fifth contacts for conducting signals of a differential pair 1 receiver for PCI Express B channel;

fifty-fourth and fifty-sixth contacts for conducting signals of a differential pair 1 transmitter for PCI Express B channel;

fifty-seventh and fifty-ninth contacts for conducting signals of a differential pair 2 receiver for PCI Express B channel;

fifty-eighth and sixtieth contacts for conducting signals of a differential pair 2 transmitter for PCI Express B channel;

sixty-first and sixty-third contacts for conducting signals of a differential pair 3 receiver for PCI Express B channel;

sixty-second and sixty-fourth contacts for conducting signals of a differential pair 3 transmitter for PCI Express B channel;

sixty-fifth and sixty-seventh contacts for conducting signals of a differential pair 4 receiver for PCI Express B channel;

sixty-sixth and sixty-eighth contacts for conducting signals of a differential pair 4 transmitter for PCI Express B channel;

sixty-ninth and seventy-first contacts for conducting signals of a differential pair 5 receiver for PCI Express B channel;

seventieth and seventy second contacts for conducting signals of a differential pair 5 transmitter for PCI Express B channel;

seventy-third and seventy-fifth contacts for conducting signals of a differential pair 6 receiver for PCI Express B channel;

seventy-fourth and seventy-sixth contacts for conducting signals of a differential pair 6 transmitter for PCI Express B channel;

seventy-seventh and seventy-ninth contacts for conducting signals of a differential pair 7 receiver for PCI Express B channel;

seventy-eighth and eightieth contacts for conducting signals of a differential pair 7 transmitter for PCI Express B channel;

an eighty-first contact for conducting a system power good signal;

an eighty-second contact for conducting a local area network (LAN) wake-up signal;

eighty-third and eighty fourth contacts for grounding; and contacts G1 to G12 for grounding.

6. The blade server system according to claim 5, wherein the connector specification complies with an Upper_Daughter specification with characteristics of high speed, 0.8 mm, male, double row, differential pairs, Surface Mounted Device (SMD), and 84 contacts.

7. A blade server system, comprising:
a middle plane board including a first connector; and
a server blade including a second connector for being electrically connected to the first connector, the second connector including a plurality of contacts in compliance with a connector specification, the contacts including:
first to ninth, $11^{th}$, $13^{th}$, $15^{th}$, $17^{th}$, $19^{th}$, $21^{st}$, $23^{rd}$, $25^{th}$, $27^{th}$, $29^{th}$, $31^{st}$, $33^{rd}$, $35^{th}$, $37^{th}$, $39^{th}$, $41^{st}$, $43^{rd}$, $45^{th}$, $47^{th}$, $49^{th}$, $51^{st}$, $53^{rd}$, $55^{th}$, $57^{th}$, $59^{th}$, $61^{st}$, $63^{rd}$, $65^{th}$, $67^{th}$, $69^{th}$, $71^{st}$, $73^{rd}$, $75^{th}$, $77^{th}$, $79^{th}$, $81^{st}$, $83^{rd}$, $85^{th}$, $87^{th}$, $89^{th}$, $91^{st}$, $93^{rd}$, $95^{th}$, $97^{th}$, $99^{th}$, $101^{st}$, $103^{rd}$, $105^{th}$, $107^{th}$, $109^{th}$, $111^{th}$, $113^{th}$, $115^{th}$, $117^{th}$, and $119^{th}$ contacts for conducting signals for Peripheral Component Interconnect (PCI) address/data;
contacts G1 to G12 for grounding;
a $10^{th}$ contact for conducting a signal for indicating fiber channel present;

$12^{th}$, $14^{th}$, $84^{th}$, and 86 contacts for conducting PCI interrupt signals;
a $16^{th}$ contact for conducting a PCI clock signal;
an $18^{th}$ contact for conducting a PCI reset signal;
a $20^{th}$ contact for conducting a PCI grant bus 0 signal;
a $22^{nd}$ contact for conducting a PCI request bus 0 signal;
a $24^{th}$ contact for conducting a PCI parity signal;
a $26^{th}$ contact for conducting a PCI stop signal;
a $28^{th}$ contact for conducting a PCI device selection signal;
a $30^{th}$ contact for conducting a PCI target ready signal;
a $32^{nd}$ contact for conducting a PCI initiator ready signal;
a $34^{th}$ contact for conducting a PCI frame signal;
a $36^{th}$ contact for conducting a PCI system error signal;
a $38^{th}$ contact for conducting a PCI parity error signal;
a $40^{th}$ contact for conducting an I2C clock signal;
$42^{nd}$, $44^{th}$, $46^{th}$, and $66^{th}$ contacts for PCI bus command and byte enable signals;
a $50^{th}$ contact for conducting a 66 Mhz enable signal;
a $52^{nd}$ contact for conducting a 64-bit acknowledge transfer signal;
a $54^{th}$ contact for conducting a 64-bit request transfer signal;
a $56^{th}$ contact for conducting a 64-bit parity check signal;
a $58^{th}$ contact for conducting a I2C data signal;
a $68^{th}$ contact for conducting a PCI-X capable signal;
a $70^{th}$ contact for conducting a PCI request bus 2 signal;
a $72^{nd}$ contact for conducting a PCI grant bus 2 signal;
a $74^{th}$ contact for conducting a PCI clock signal;
a $76^{th}$ contact for conducting an initialization device selection 2 signal;
a $78^{th}$ contact for conducting an initialization device selection 1 signal;
an $80^{th}$ contact for conducting a PCI lock signal;
an $82^{nd}$ contact for conducting a PCI power management event (PME) signal;
an $88^{th}$ contact for conducting a Small Computer System Interface (SCSI) interrupt B signal;
a $90^{th}$ contact for conducting a SCSI interrupt A signal;
a $92^{nd}$ contact for conducting a zero crossing (ZCR) present signal;
a $94^{th}$ contact for conducting a ZCR grant bus signal;
a $96^{th}$ contact for conducting a standby 5V power signal;
a $98^{th}$ contact for conducting a standby 3.3V power signal;
$100^{th}$, $102^{nd}$, $104^{th}$, and $106^{th}$ contacts for conducting system 5V power signals;
$108^{th}$, $110^{th}$, $112^{th}$, $114^{th}$, $116^{th}$, and $118^{th}$ contacts for conducting system 3.3V power signals; and
a $120^{th}$ contact for conducting a system 12V power signal.

8. The blade server system according to claim 7, wherein the connector specification complies with a Down_Daughter specification with characteristics of high speed, 0.8 mm, male, double row, SMD, and 120 contacts.

9. A blade server system, comprising:
a middle plane board including a first connector; and
a server blade including a second connector for being electrically connected to the first connector, the second connector including a plurality of contacts in compliance with a connector specification, the contacts including:
a first contact for conducting a PCI system error signal;
a second contact for conducting a PCI parity error signal;
a fourth contact for conducting a system management bus clock signal;
a sixth contact for conducting a system management bus data signal;
third, fifth, seventh, eighth, $13^{th}$ to $16^{th}$, $22^{nd}$, $23^{rd}$, and $31^{st}$ to $35^{th}$ contacts for grounding;
ninth to $12^{th}$ contacts for conducting system 12V power signals;
$17^{th}$ to $21^{st}$ contacts for conducting system 3.3V power signals;
$24^{th}$, $26^{th}$, $28^{th}$, and $30^{th}$ contacts for conducting system 5V power signals;
$25^{th}$, $27^{th}$, and $29^{th}$ contacts for conducting system 1.5V power signals;
$36^{th}$ and $38^{th}$ contacts for conducting standby 3.3V power signals;
a $37^{th}$ contact for conducting a PCI present 1 signal;
a $39^{th}$ contact for conducting a PCI present 2 signal; and
a $40^{th}$ contact for conducting a PCI power management event (PME) signal.

10. The blade server system according to claim 9, wherein the connector specification complies with a PCI_Base_Conn specification with characteristics of high speed, 0.8 mm, male, double row, SMD, and 40 contacts.

11. A blade server system, comprising:
a middle plane board including a first connector; and
a server blade including a second connector for being electrically connected to the first connector, the second connector including a plurality of contacts in compliance with a connector specification, the contacts including:
first and third contacts for conducting signals of differential pair 1 transmitter for PCI Express channel A;
a second contact for conducting a PCI base board present signal;
a fourth contact for conducting a PCI bus reset signal;
fifth, $11^{th}$, $17^{th}$, $23^{rd}$, $29^{th}$, $30^{th}$, $35^{th}$, $36^{th}$ contacts for grounding;
a sixth contact for conducting a system power normal signal;
seventh and ninth contacts for conducting signals of a differential pair 3 receiver for PCI Express channel A;
an eighth contact for conducting a system management bus clock signal;
a tenth contact for conducting a system management bus data signal;
a twelfth contact for conducting a system 12V power signal;
$13^{th}$ and $15^{th}$ contacts for conducting signals of a differential pair 3 transmitter for PCI Express channel A;
a $14^{th}$ contact for conducting a system 5V power signal;
$16^{th}$, $18^{th}$, $20^{th}$, and $22^{nd}$ contacts for conducting system 3.3V power signals;
$19^{th}$ and $21^{st}$ contacts for conducting signals of a differential pair 2 transmitter for PCI Express channel A;
a $24^{th}$ contact for conducting a standby 3.3V power signal;
$25^{th}$ and $27^{th}$ contacts for conducting signals of a differential pair 0 transmitter for PCI Express channel A;
$26^{th}$ and $28^{th}$ contacts for conducting system 1.5V power signals;
$31^{st}$ and $33^{rd}$ contacts for conducting signals of a differential pair 0 receiver for PCI Express channel A;
$32^{nd}$ and $34^{th}$ contacts for conducting signals of a differential pair 2 transmitter for PCI Express channel A;
$37^{th}$ and $39^{th}$ contacts for conducting signals of a differential pair 1 receiver for PCI Express channel A; and
$38^{th}$ and $40^{th}$ contacts for conducting clock differential pair receiving signals for PCI Express channel A.

12. The blade server system according to claim 11, the connector specification complies with a PCI_Base_Conn specification with characteristics of high speed, 0.8 mm, male, double row, SMD, and 40 contacts.

* * * * *

UNITED STATES PATENT AND TRADEMARK OFFICE
CERTIFICATE OF CORRECTION

PATENT NO. : 7,657,677 B2  Page 1 of 1
APPLICATION NO. : 11/272901
DATED : February 2, 2010
INVENTOR(S) : Huang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1114 days.

Signed and Sealed this

Thirtieth Day of November, 2010

David J. Kappos
*Director of the United States Patent and Trademark Office*